United States Patent [19]
Levy et al.

[11] Patent Number: 5,627,994
[45] Date of Patent: May 6, 1997

[54] METHOD FOR THE ASSIGNMENT OF REQUEST STREAMS TO CACHE MEMORIES

[75] Inventors: Hanoch Levy, Rockville, Md.; Robert J. T. Morris, Los Gatos, Calif.

[73] Assignee: International Business Machines Corporation, Armonk, N.Y.

[21] Appl. No.: 283,098

[22] Filed: Jul. 29, 1994

[51] Int. Cl.$^6$ .................................................. G06F 12/02
[52] U.S. Cl. ..................... 395/477; 395/446; 364/DIG. 1
[58] Field of Search ........................... 395/650, 465, 395/477, 446, 456; 364/DIG. 1, 281, 281.3, 281.6

[56] References Cited

U.S. PATENT DOCUMENTS

| | | | |
|---|---|---|---|
| 4,468,730 | 8/1984 | Dodd et al. | 395/440 |
| 4,536,836 | 8/1985 | Dodd et al. | 395/440 |
| 4,835,678 | 5/1989 | Kofuji | 395/445 |
| 4,888,681 | 12/1989 | Barnes et al. | 395/600 |
| 4,928,225 | 5/1990 | McCarthy et al. | 395/472 |
| 4,972,314 | 11/1990 | Getzinger et al. | 395/476 |
| 5,029,070 | 7/1991 | McCarthy et al. | 395/470 |
| 5,185,871 | 2/1993 | Frey et al. | 395/375 |
| 5,228,134 | 7/1993 | MacWilliams et al. | 395/465 |

OTHER PUBLICATIONS

J. M. Rosenberg, *Dictionary of Computers, Information Processing and Telecommunications* 2nd ed., 1987, pp. 67 & 655. John Wiley & Sons.

S. Krakowiak [trans. D. Beeson] *Principles of Operating Systems*, MIT Press, 1987, pp. 211–214.

E. G. Coffman, Jr. and P. J. Denning, *Operating Systems Theory*, Prentice–Hall, Inc., 1973, pp. 275–278.

E. Gelenbe and I. Mitrani, *Analysis and Synthesis of Computer Systems*, Academic Press, 1980, pp. 9–13.

B. V. Gnedenko and I. N. Kovalenko, [trans. E. R. Kondor and D. Louvish] *Introduction To Queueing Theory*, Israel Program for Scientific Translations, Jerusalem, 1968, pp. 1–18.

P. G. Emma et al., Cache Miss Leading Edge Processing, IBM Tech. Disclosure Bulletin, vol. 32, No. 7, Dec. 1989.

R. D. Hoover et al., Processor Performance Enhancement Using a Memory Cache Scheme, IBM Tech. Disclosure Bulletin vol. 32, No. 6A Nov. 1989.

E. G. Coffman, Jr. et al., Operating System Theory, pp. 241–284, 1973, (book).

A. J. Smith, Cache Memories, Computing Surveys, vol. 14, No. 3, pp. 473–530.

J. Gecsei et al., Evaluation Techniques for Storage Hierarchies, Storage Hierarchy Evaluation, IBM Systems Journal, vol. 9, No. 2, pp. 78–117, 1970.

(List continued on next page.)

Primary Examiner—Tod R. Swann
Assistant Examiner—J. Peikari
Attorney, Agent, or Firm—James C. Pintner

[57] ABSTRACT

A method is provided for providing a cache architecture for a database system having a given number of request streams and a given number of pages of random access memory available for use in one or more caches. The cache architecture includes (i) an allocation of memory pages over a number of caches, and (ii) an assignment of the request streams to the caches. Given that the number of caches is less than the number of streams, the method according to the invention allocates memory pages to the caches and assigns streams to the caches so as to optimize the memory access hit ratio for a given trace of memory requests from the streams. The method includes obtaining characterization information for the request streams (mean burst sizes and cache depth distributions based on the sequence of requests in the trace), and using the characterization information to predict the hit ratios for proposed superpositions of the request streams. An efficient algorithm allows request streams to be superposed, a pair at a time, optimizing the hit ratio for each superposition based on the characterization information.

30 Claims, 10 Drawing Sheets

OTHER PUBLICATIONS

A. J. Smith, Bibliography and Readings on CPU Cache Memories and Related Topics, Computer Science Div., EECS Dept., Univ. of California Berkeley, CA, pp. 22–41.

I. J. Haikala, Cache Hit Ratios with Geometric Task Switch Intervals, IEEE, 0194–7111/84, pp. 364–371.

J. Z. Teng et al., Managing IBM Database 2 Buffers to Maximize Performance, IBM Sys. Journal, vol. 23, No. 2, 1984, pp. 211–219.

H. S. Stone, Optimal Partitioning of Cache Memory, IEEE Transactions on Computers, vol. 41, No. 9, Sep. 92, pp. 1054–1068.

Hit ratio for superposed stream — very bursty streams, non-overlapping.

Hit ratio for superposed stream — very bursty streams, frequently alternating.

Closer Examination of Lower End of Fig. 6
Hit ratio for superposed stream — very bursty streams, frequently alternating Hit ratio for superposed stream — less bursty streams.

Closer Examination of Lower End of Fig. 8
Hit ratio for superposed stream — less bursty streams.

Miss Ratio of Cache Assignment Algorithm.

METHOD FOR THE ASSIGNMENT OF REQUEST STREAMS TO CACHE MEMORIES

FIELD OF THE INVENTION

The invention generally relates to memory management optimization of architecture in the assignment of data request streams and memory resources to caches or buffer pools. More specifically, the invention relates to the optimal use of such caches or buffer pools in database management systems.

BACKGROUND OF THE INVENTION

In computer architectures using mass storage devices, such as disk drives, time delays in memory access are imposed by considerations such as disk revolution times. It has been a challenge for system designers to find ways to reduce these access delays. A commonly used technique has been to provide one or more regions of high speed random access memory, called caches. Portions of the contents of the mass storage are copied into the cache as required by the processor, modified, and written back to the mass storage. Caches continue to be one of the most pervasive structures found in computer systems. They are used at every layer of the memory hierarchy. Several levels are usually present in the processor. Primary memory management is traditionally based on a cache model, and files are cached in hierarchical storage management across secondary, tertiary, and networked storage.

While many variations have been developed over the years, the predominant principle in the management policies for these caches is a Least Recently Used replacement rule, typically applied uniformly across all pages of the cache. (For the purposes of the present invention, there are no limitations on the size of a page of a cache, or of the number of pages which can be in a cache.) If a memory request is directed to an address within a page of data which is not presently copied into the cache, then the page of data within the cache which was least recently used by the processor is copied back to the mass storage, and the page containing the newly requested address is copied from the mass storage into that portion of the cache. (Note that the least recently used page of data may be copied back to mass storage in advance of this new request, to improve performance by reducing access time.)

For the purpose of the discussion which follows, caches will be treated as fully associative. That is, for a given request to a given cache, the entire contents of the cache are searched for an exact match with the entire request. This is typical for database applications, in which the matching is done in software, and high speed is an important, but not critical, consideration.

By contrast, in a set associative cache arrangement, only a small region of the cache (the region is called a "set") is searched, for a match with the request (such as an address match). This latter arrangement is more commonly used in processor applications, involving hardware implementation and requiring greater access speed. See also Smith, "Cache Memories," Computing Surveys, vol. 14, no. 3, September 1982, pp. 473–530, ACM0010-4892/82/0900-0473, section 2.2, "Placement Algorithm."

Replacement algorithms are discussed in general in Smith, "Cache Memories," at section 2.4, "Replacement Algorithm". A formal definition of Least Recently Used is given in Coffman and Denning, "Operating Systems Theory," Englewood Cliffs, N.J.: Prentice-Hall, Inc. (1973), p. 245.

The operation of an LRU cache is as follows: Consider a finite size cache consisting of K page frames, buffers, or locations, with indexes denoted 1, 2, . . . K. If a request is made for page p, and the page p is found in position j, then the page p is moved to position 1 of the cache, the "most recently used position," and the pages formerly in positions 1, 2, . . . j−1 1 are pushed one position deeper into the cache. That is, the index of each of these pages is increased by 1. If the page p is not found in the cache, then it is brought from mass storage into the cache, and stored in position 1. All of the pages formerly in positions 1, 2, . . . K−1 are pushed one position deeper into the cache, to positions 2, 3, . . . K, respectively, and the page at position K is removed from the cache and returned to mass storage.

The event, in which the page p is requested and is found already to be in the cache, is called a hit. An event in which the page p is requested and not found in the cache, is called a miss. The ratio of page requests which are hits to total page requests is called the hit ratio. Similarly, the ratio of page requests which are misses to total page requests is called the miss ratio. Since the I/O rate to the level of storage below the cache in the hierarchy is directly proportional to the miss ratio, it is deskable to make the miss ratio as small as possible, or, conversely, to make the hit ratio as large as possible, in order to minimize the number of times that memory accesses are delayed because of the need to access mass storage.

BUFFER ALLOCATION AND CACHE ASSIGNMENT

Sometimes, data elements of separate types are kept segregated in separate caches. For example, separate caches are maintained in a processor for instruction and data words, or separate buffer pools are maintained in a database management system for index and data (or complex query and transaction) pages. The general question as to when it is better to segregate caches, and when it is better to combine them, has had no simple solution.

Given the basic definitions (above), the buffer allocation and cache assignment problems will be defined. There are N page request streams, $P^1, \ldots P^N$, L LRU caches, where $1 < L < N$, and a total of K buffers, or page frames of space, are to be allocated over the L caches. Let each cache l, where $1 < l < L$, be allocated $K_l$ buffers, such that $$\sum_{l=1}^{L} K_l = K \qquad (1)$$

The set of N streams is partitioned into L subsets, each subset of streams corresponding to a single cache. A page request for any given stream is directed to the cache corresponding to the subset containing that stream. For example, if there are 4 streams, one possible partition to 3 caches is {{1,3},{2},{4}} in which requests of streams 1 and 3 are directed to cache 1, requests of stream 2 are directed to cache 2, and those of stream 4 to cache 3.

Two problems can now be formulated:

1. Buffer allocation problem:
   Given a partition of the N streams to L caches, find an optimal allocation of the K buffers to the L caches which minimizes the overall miss ratio.
2. Cache assignment problem:
   Given L caches, find an assignment of the N streams to the L caches which, under the optimal solution to the buffer allocation problem, minimizes the miss ratio. Among the various cache assignments, two are of special interest:

1) Fully split assignment:
   Under this assignment, the number of caches is N, and each cache is dedicated to exactly one stream. The optimal allocation of buffers under the fully split assignment is called the optimal fully split buffer allocation.
2) Fully shared assignment:
   Under this assignment, the number of caches is 1, and all streams are assigned to that one cache.

One computer system design consideration, then, is the Buffer Allocation problem: how to allocate available blocks of random access memory among several different caches. One technique for optimizing the allocation of memory resources among caches was taught by Stone, Turek, and Wolf, in "Optimal Partitioning of Cache Memory," IEEE Transactions on Computers, vol. 41, no. 9, September 1992, pp. 1054–1068. Stone et al. obtain an approximation of an optimal allocation of memory to caches by deriving continuous functions that approximate the discrete misses (miss rate times a length of a time period) for two caches and two request streams, differentiating the continuous functions, and finding the memory allocation at which the two derivatives have equal values. See pp. 1056–1058. However, because the Stone et al. technique uses linear regression to find the parameters of a continuous approximation to discrete points (i.e., the misses that take place during the time period), it provides an approximation which may in some cases be inaccurate.

The Cache Assignment problem, a separate consideration for system designers, comes into play where there are several different streams of data requests, such as in a database application. These different request streams may have widely different characteristics. For instance, one request stream might require data requests concentrated within a narrow address range, while another stream might require data requests from widely scattered address regions. Also, one stream might require memory requests at infrequent intervals, while another might require "bursts" of requests, i.e., many memory requests in close succession. A cache architecture should attempt to meet the memory access needs of the different request streams in a fashion which optimizes the overall hit ratio.

Taking into account both of these considerations, the problem for system designers may be defined more generally, as follows: Given a set of streams of requests and a set of caches, determine which streams should be assigned to which caches to maximize performance.

Several intuitive arguments illustrate the tradeoffs. Suppose there are two streams X and Y. It would appear to be advantageous to share system resources, such as the memory in a cache, as much as possible. This consideration would favor the use of the single shared cache. If X and Y rarely require use of the cache at the same time, then the cache resource may be used by Y when X is not using it, and vice versa. On the other hand, if the X stream has much more temporal locality of reference than Y (that is, if for a period of time a set of pages tend to be used with some repetition), then a portion of the cache could be reserved exclusively for the use of X, free from the effect of the Y references which are rarely re-referenced, and tend to displace the elements referenced by X. Alternatively, X and Y might coexist quite well in a first shared cache, but neither may coexist with two other streams A and B, which may in turn coexist quite well together sharing a second cache.

SUPERPOSITION OF REQUEST STREAMS

For any cache assignment other than the fully split assignment, at least two of the request streams are assigned to the same cache. The same cache then experiences the arrival of requests from both of the streams, from a process called the superposition of the request streams. In the example given above (four request streams to be allocated over three caches), streams 1 and 3 were superposed to cache 1. When two streams are superposed, or combined together, in a single cache, the manner in which they are combined plays an important part in determining the resulting performance.

To illustrate the importance of how the superposition occurs, consider two mutually exclusive streams $P_a$ and $P_b$, the first requesting pages $a_1, a_2, \ldots a_K$ in cyclic order, and the second requesting pages $b_1, b_2, \ldots b_K$ in cyclic order. Each of the streams separately will achieve 100% hit ratio with a cache of size K or greater, and 0% hit ratio with any smaller cache.

If the two streams are superposed into a cache with a pure interleaving, resulting in the sequence $a_1, b_1, a_2, b_2, \ldots a_K, b_K$, repeated cyclically, then a shared cache of size 2K or more will achieve 100% hit ratio, but any smaller size cache will achieve 0% hit ratio. On the other hand, if the method of combining results in a long run or burst of contiguous requests from one of the two streams, followed by a similar contiguous burst of requests from the other stream, then a large hit ratio can be achieved with a cache of just size K. Therefore, the nature of the combining, or superposition, process for request streams (taking into account the burst characteristics of the streams) is critical in determining the end performance of a given buffer allocation and cache assignment, and thus in deciding how to assign and allocate the caches.

To evaluate the superposition of two given request streams, therefore, it is necessary to either have information, or make assumptions, about the characteristics of the request streams. One possible assumption about how streams might be combined is obtained by simply switching between them according to random independent trials. This random switching is called a Bernoulli process. It can be shown that a Bernoulli assumption leads to optimization by means of a fully split arrangement.

On the other hand, when the stream superposition is not Bernoulli, but rather contains long bursts from one stream, poor sharing and suboptimal performance can result from a fully split arrangement. As illustrated above, it is precisely the interaction of streams and the non-Bernoulli mixing, or burst characteristics, of individual streams, that will govern the decision whether the streams are to share caches. Thus, a useful technique for superposing request streams to optimize performance requires a method to estimate the effect on a cache of non-Bernoulli mixing of streams, and the resultant effect on the overall hit ratio. Such a method of estimation has not been available. Thus, there remains an unsolved problem of how to assign reference streams to caches, so as to optimize the hit ratio.

SUMMARY OF THE INVENTION

It is therefore an object of the invention to provide a method for allocating request streams and memory resources to a cache architecture, in such a way as demonstrably to improve or optimize system performance, as measured by the hit ratio.

In order to achieve this and other objects, there is provided in accordance with the invention a method for assigning request streams to caches. The method of the invention has two basic steps. First, characterization information is received for the request streams. Then, using the characterization information, an assignment of the request streams to the caches is determined, such that the likelihood is optimized that a request from a given request stream is directed to a data page which is within the cache to which the given request stream is assigned.

Given the characterization information, it is possible to make determinations about the effect on the hit ratio of superposing request streams. Request streams are paired and tested, one pair at a time, using the characterization information, to obtain a hit ratio which results if the respective pair of request streams is superposed. The optimal combination of two of the request streams is identified, based on the optimum hit ratios found by testing the pairing assignments. Then, the characterization information is updated, and the pairing and testing process is repeated, until the number of streams resulting from all of the superposing results in a minimum miss ratio, or results in a suitably small number of caches.

The first step of obtaining characterization information includes characterizing the combined request stream, using a method more compact than a complete trace. This is done using the stack reference model, and a switching model. The stack reference model has been quite successful in capturing temporal locality of references within a trace. This step includes processing through a trace of requests from the different streams, and identifying the requests, within the trace, for each given request stream. Two types of characterization information are obtained. First, a depth distribution is obtained. The depth distribution measures statistics regarding the position within an LRU-managed cache at which the page which matches a given request is found. The second characterization information is a mean burst size for each stream, measured relative to any other stream.

Second, the depth distribution information is used to produce a page allocation of memory resources for a fully split buffer allocation. The number of separate caches ultimately desired is less than the number of caches required to support fully split allocation.

Third, to examine the impact of allowing streams X and Y to share a cache, superpositions of streams into a cache are evaluated. A fast, approximate solution to the problem of non-Bernoulli mixing of streams is given. A matrix is produced, containing measurements which give, for any given combined stream of streams X and Y, the above characterization information. This information is provided for all possible pairs of streams.

Fourth, two of the streams, which produce the optimum hit ratio when combined into one cache, are selected. Then, the characterization information is updated. The steps of evaluating superpositions and selecting superpositions to optimize hit ratio are executed repeatedly, until the number of streams, taking into account all of the superpositions, results in a minimal miss ratio, or equals the number of caches desired, and the buffer allocation is optimal for that number of caches.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

CACHE ASSIGNMENT ALGORITHM

Figure 1:
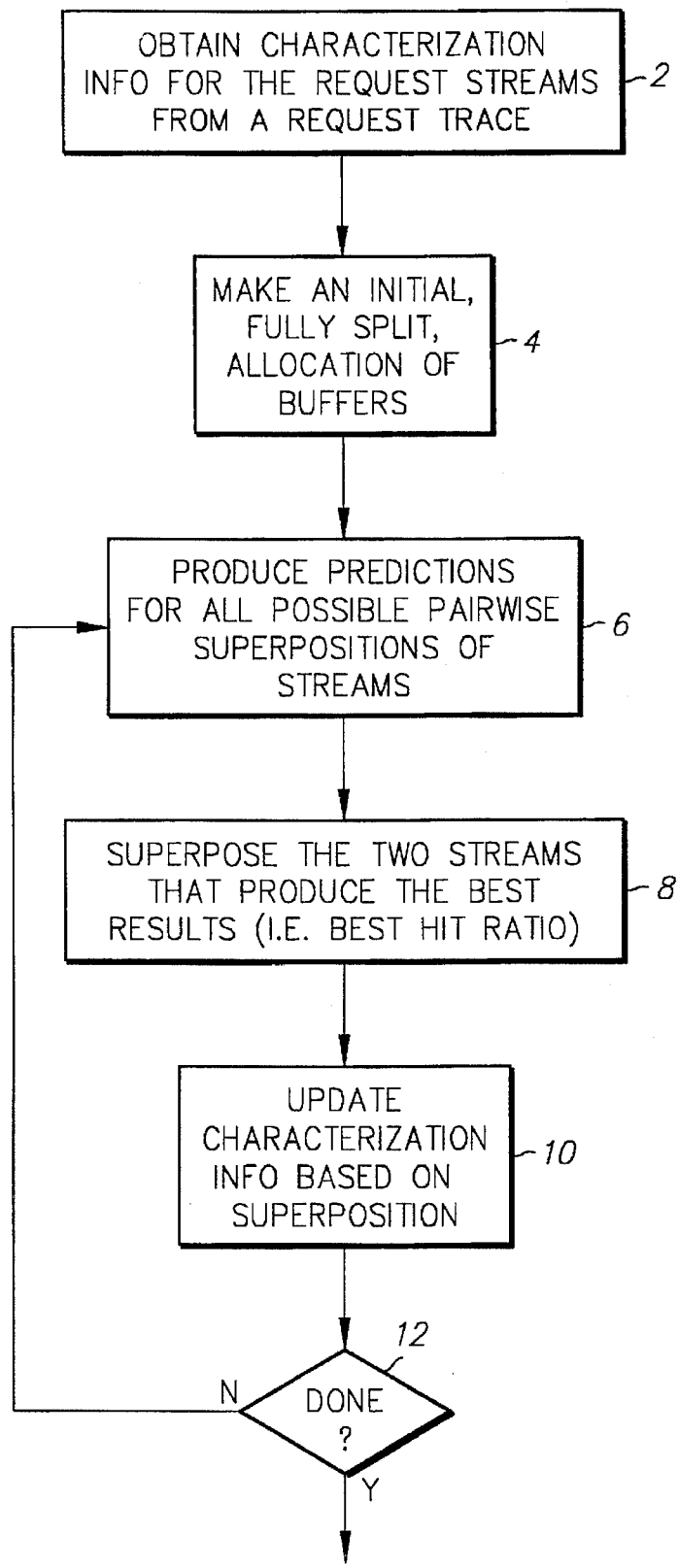
FIG. 1 is a flowchart showing the method of the invention.

FIG. 1 is a high level flowchart showing, in summarized form, the steps of the method of the invention. The present specification is organized around the principle of, first, presenting a theoretical basis for the operation, and, second, showing implementation details. Accordingly, the theoretical basis will be given with reference to the high level steps of FIG. 1. The detailed implementation will then be given in further discussion and more detailed flowcharts, with reference to the steps of FIG. 1 which the discussion and the more detailed flowcharts represent.

The method of the invention takes, as input, (i) a quantity of pages, or buffers, of memory to be allocated for caches, and (ii) a trace of requests from a given number of request streams. The number of caches to be ultimately produced may or may not be specified, but will typically be less than the number of request streams. The output of the method is (i) a number of caches and an allocation of the available memory pages to the caches, and (ii) an assignment of the request streams to the caches. Each request stream is assigned to one cache. For any given cache which has more than one request stream assigned to it, the request streams assigned together to that cache will have been subjected to the process of superposition in the course of the method of the invention.

Step 2 of FIG. 1 takes the trace of requests as an input, and extracts characterization information from the trace. Preferably, two types of information are obtained. The first is a depth distribution for each stream, and the second is a mean burst length for each of the possible pairs of streams. While the latter is relatively self-explanatory, the former will be discussed in detail.

DEPTH DISTRIBUTION OF A SINGLE STREAM

Consider an input trace of memory requests from N page request streams $P^1, \ldots P^N$. Operation of a memory management system may be simulated by processing through the trace, request by request, and simulating the accessing of pages of memory from mass storage to a cache structure, movement of the accessed pages within the cache structure, and restoring of the pages of memory to the mass storage, responsive to each successive request of the trace which is processed in turn.

For any given page which is requested at any point in the trace, it is possible to follow the movement of the page through an LRU cache. The page, when accessed, is initially placed at the top of a cache. The page moves downward in the cache as other pages are requested, occasionally moves back to the top of the cache if it is requested again, and eventually is pushed off the bottom of the cache, i.e., is written back to mass storage. LRU caches have numbered positions, each position holding a page. As different pages are requested, the numbered position of a given page changes. The sequence of position changes is called the trajectory of the page.

The N request streams have stack depth distributions $d^1(n), \ldots, d^N(n)$. The stack distribution $d^i(n)$ is defined as the probability that a current request, in a stream i, finds a page which it is referencing in a LRU-managed cache at a depth n. During the course of processing through the trace and observing the individual references to each memory page, and the movement of each memory page from the top cache position at the time of access to lower positions within the cache structure as other pages are accessed, the depth distributions may be estimated in terms of the sequence of requests within the trace, and the depths within the cache of the requested pages as of the times at which they are requested.

Mattson, Gecsei, Slutz, and Traiger noted, in "Evaluation Techniques for Storage Hierarchies," IBM Systems Journal, Vol. 9, No. 2, 1970, pp. 78–117, that the depth distribution of a trace of page-requests can be computed with a single pass through the trace of the memory requests from a single stream. In accordance with the invention, the single-pass computation of depth distributions is repeated for an arbitrary number of streams.

Pages that have never previously been accessed, and are therefore not in the cache, will be assumed to be found at an infinite stack depth. Thus, $d^i(\infty)$ is defined as the probability of such an event. (Note that $d^i(n)$ may be regarded as a "defective" distribution, in that it may not sum to unity.)

Similarly, $D^i(n)$ is defined as the cumulative depth distribution of the request stream i. That is, $$D^i(n) = \sum_{m=1}^{n} d^i(m) \quad (2)$$

where n is the total number of cache positions (depths), and $n<\infty$. Also, the cumulative depth distribution is defined as $D^i(0)=0$.

For modeling purposes it is assumed that the streams of requests obey the "stack reference model", as defined in Coffman and Denning (cited above). Such streams will be called stack reference streams. That is, they are stochastic processes which choose their next reference according to an independent sampling of the stack depth distribution. This is one of several simple models for reference streams. Coffman and Denning reported that this model tends to be quite successful in capturing temporal locality of references within a trace, and is superior to the so-called independent reference model.

OBTAINING THE REQUEST STREAM CHARACTERIZATION

Figure 2:
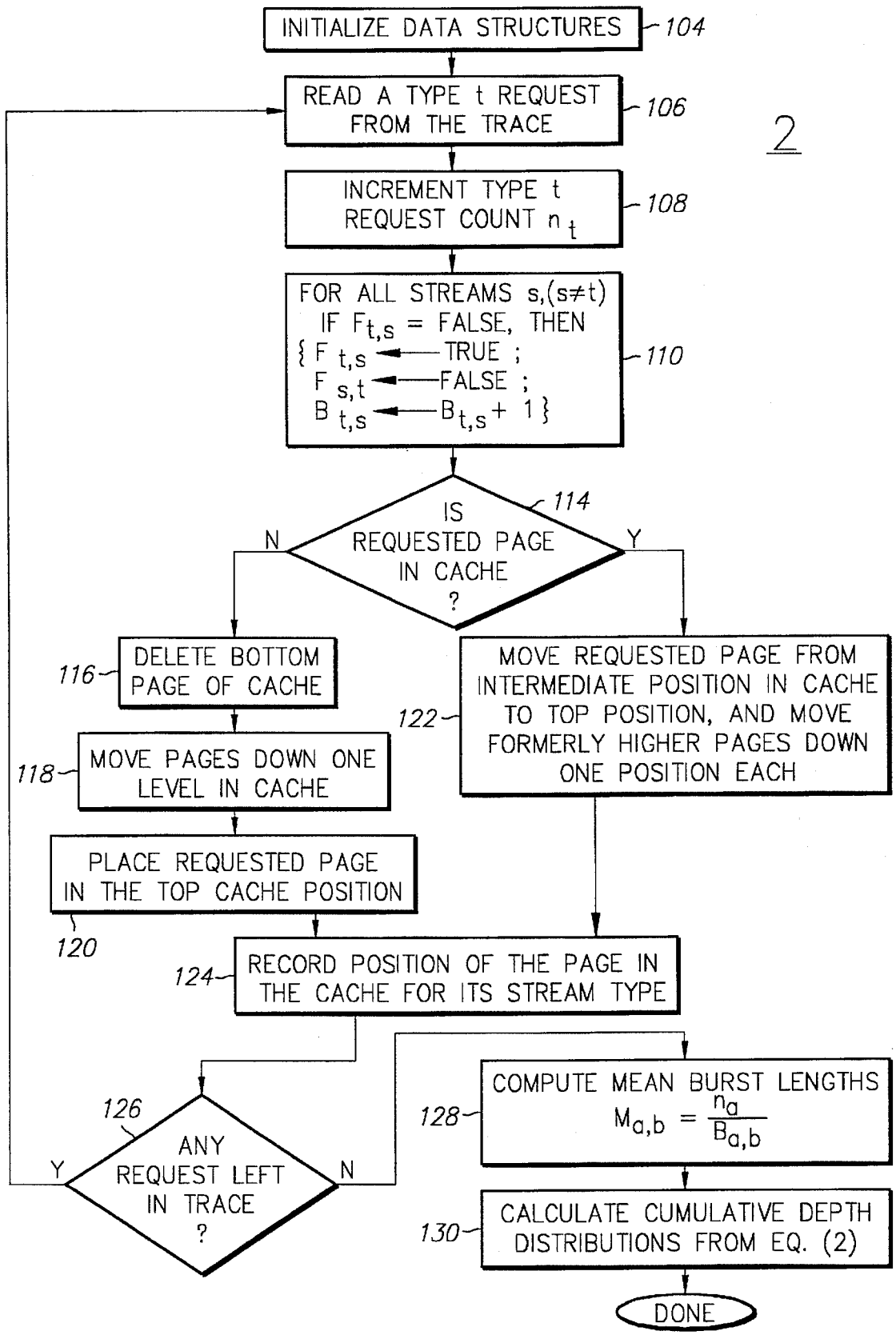
FIG. 2 is a more detailed flowchart of step 2 of FIG. 1.

In view of the above, a detailed discussion of the process of obtaining the request stream characterization information in accordance with the invention will now be made. Step 2 of FIG. 1 is described in detail in FIG. 2. FIG. 2 provides a detailed description of how the characterization information is obtained in the course of processing, a single time, through a trace of requests from several request streams.

As the trace is processed, counts are maintained for the number of bursts for each request stream and the number of requests in each stream, and state information is maintained.

After this information is accumulated, characterization information such as a mean burst length can readily be calculated. Also, cache management operations, which would take place for the request stream, are simulated for a hypothetical, fully split, cache architecture. Positions of the pages requested by requests from each of the streams are observed as each successive request is processed. From these observations of the trajectories of the requested pages, depth distributions may also readily be obtained.

Referring to FIG. 2, a detailed description of step 2 of FIG. 1, wherein characterization information, including burst size information, from a request trace is obtained, will now be given. The description which follows is a preferred method for implementing step 2.

Given a page request sequence, or trace, P of length R, having requests from N request streams, the objective is to produce mean burst sizes for each of two page types a and b, where $1<a, b<N$, and $a \neq b$, in a sequence consisting of the sequence P, with all requests deleted other than those for type a or b pages. This computation can be done for all pairs of request types for the N streams, using a single run over the trace P. The time complexity is O(RN). The ability to perform the required computations in a single run over the trace, and the time complexity, are considered to be advantageous features of the preferred implementation of step 2.

Certain data structures are employed in the preferred implementation. The definition of these data structures is part of the environment of the invention, although the act of defining the data structures is not necessarily a part of the preferred implementation itself. For clarity, the data structures are presented in terms of definitions, as follows:

Define a matrix of flags $F_{a,b}$ with the meaning that, for all page types a and b as above, $F_{a,b}$ is TRUE if a is more recent than b for the current position in the run over the trace P, and FALSE otherwise. Note that the flags F are neither needed nor defined for the diagonal elements of the matrix, where a=b. It will be clear to a person skilled in the art that only a subdiagonal matrix is needed. However, as described here, it is simpler to define an algorithm using both superdiagonal and subdiagonal parts. There will be a negligably small loss in computational efficiency by retaining both parts of the matrix.

Also define, for each page type a, a vector of values $n_a$, where $n_a$ has the meaning of the number of type a requests read up to the current position in P.

Finally, define a matrix of values $B_{a,b}$ for all a, b as above, with the meaning that the element $B_{a,b}$ is the number of bursts of contiguous type a requests in the trace obtained from P (as described above) by deleting all requests for pages of types other than a or b.

A cache data structure is also defined for each page type.

Given these definitions, the preferred implementation is as follows: First, all of the flag matrix elements $F_{a,b}$ are initialized to FALSE, and the vectors $n_a$ and the burst count matrix elements $B_{a,b}$ are initialized to 0 (step 104).

Then, the following steps are executed repeatedly: A request is read from the trace P (step 106). The request specifies a type t. That is, the request is from stream t, where t is one of the streams 1 through N. The count $n_t$ for type t requests is incremented (step 108).

For all streams (or request types) s, where s is a type value other than t, check the state of the flag $F_{t,s}$. If the flag $F_{t,s}$ is FALSE, then (a) set $F_{t,s}$=TRUE, (b) set $F_{s,t}$=FALSE, and (c) increment the matrix element $B_{t,s}$ (step 110).

Steps 108 and 110 are executed to accumulate the information that will be used to compute mean burst lengths (see step 128, below). Concurrently, to maintain the appropriate depth distribution information, the following steps are executed, as a simulation of the cache manipulation that would take place as the requests in the trace are processed. First, in step 114, a test is made to see if the page specified in the current request is already in the cache. If not, then the bottom page in the cache is deleted from the cache (step 116), each remaining page in the cache is moved down one position (step 118), and the requested page is placed in the top position of the cache (step 120) (after being read from mass storage, if applicable).

If, on the other hand, the page is already in the cache, then it is moved to the top position (if it is not already there), and any pages which had been above the requested page are moved down one position each (step 122).

Finally, in step 124, the current depth distribution information is taken, by recording the position within the cache at which the page is found in its cache.

These steps are executed repeatedly, for each request of the trace, until there are no more requests left in the trace P. At the end of each repetition, a test is made (step 126) to see if there are any more requests in the trace. If so, then processing returns to step 106 for the next request in the trace.

After all of the requests in the trace P have been processed, in step 128, a matrix M is generated, whose elements $M_{a,b}$ are given by the following formula:

$$M_{a,b} = \frac{n_a}{B_{a,b}} \tag{3}$$

Matrix elements are computed, using equation (3) for all a, b, where $1 \leq a \leq N$, $1 \leq b \leq N$, $a \neq b$, and $n_a \neq 0$ (and where $B_{a,b} \neq 0$). The matrix M has the meaning that the element $M_{a,b}$ is the mean length of bursts of type a in a sequence P with all requests for pages other than of type a or b deleted. Similarly, the element $M_{b,a}$ is the corresponding mean mength of bursts of type b in the same sequence.

In step 130, cumulative depth distributions are obtained, using equation (2), from the depth distributions obtained in step 124.

INITIAL FULLY SPLIT ALLOCATION OF BUFFERS

Referring again to FIG. 1, after the characterization information is obtained (step 2 and FIG. 2), this information is used to make an initial allocation of buffers to a fully split cache arrangement (step 4). This initial allocation forms a starting point for the remainder of the method of the invention, in which request streams are superposed and their respective caches from the fully split buffer allocation are merged.

Step 4 is executed using the depth distribution obtained in step 2. In the derivation which appears below, the depth distribution expressions developed above are used. The derivation also uses expressions for proportions of requests from given ones of the request streams, relative to the total number of requests in the trace. The latter are readily derivable from the $n_a$ vector described above. The derivation of the initial fully split buffer allocation, using the above information, will now be presented.

Consider a system consisting of L caches and L page request streams. Let the depth distribution of process i, where $1 \leq i \leq L$, be $D^iO$, and let $\lambda_i$ be the proportion of requests coming from stream i. Assume that cache i is assigned to process i and that the total number of buffers in the system is K>0. It is required to find an optimal buffer allocation $K_1^*, \ldots, K_L^*$, where $$\sum_{i=1}^{L} K_i^* \leq K \tag{4}$$

and $K_i^* > 0$, which maximizes the hit ratio. In other words, $K_1^*, \ldots, K_L^*$ is an optimal allocation if, for any other allocation $K_1, \ldots, K_L$, where $$\sum_{i=1}^{L} K_i \leq K \tag{5}$$

and $K_i > 0$, it will be true that $$\sum_{i=1}^{L} \lambda_i D^i(K_i^*) \geq \sum_{i=1}^{L} \lambda_i D^i(K_i) \tag{6}$$

The optimal solution of this problem, the optimal fully split allocation, can be found using a simple dynamic programming technique, which will now be described. This is a preferred implementation of step 4 of FIG. 1, and is given in detail in the flowchart of FIG. 3. The technique includes advancing the number of caches l from 1 to L. If the optimal allocation is obtained for l<L caches using k buffers, for all k with 0<k<K, then the optimal allocation for l+1 caches is the lowest miss ratio of any allocation in which k buffers are allocated to the first l caches and K−k buffers added to the remaining cache. The time complexity of this algorithm is $O(K^2L)$.

Figure 3:
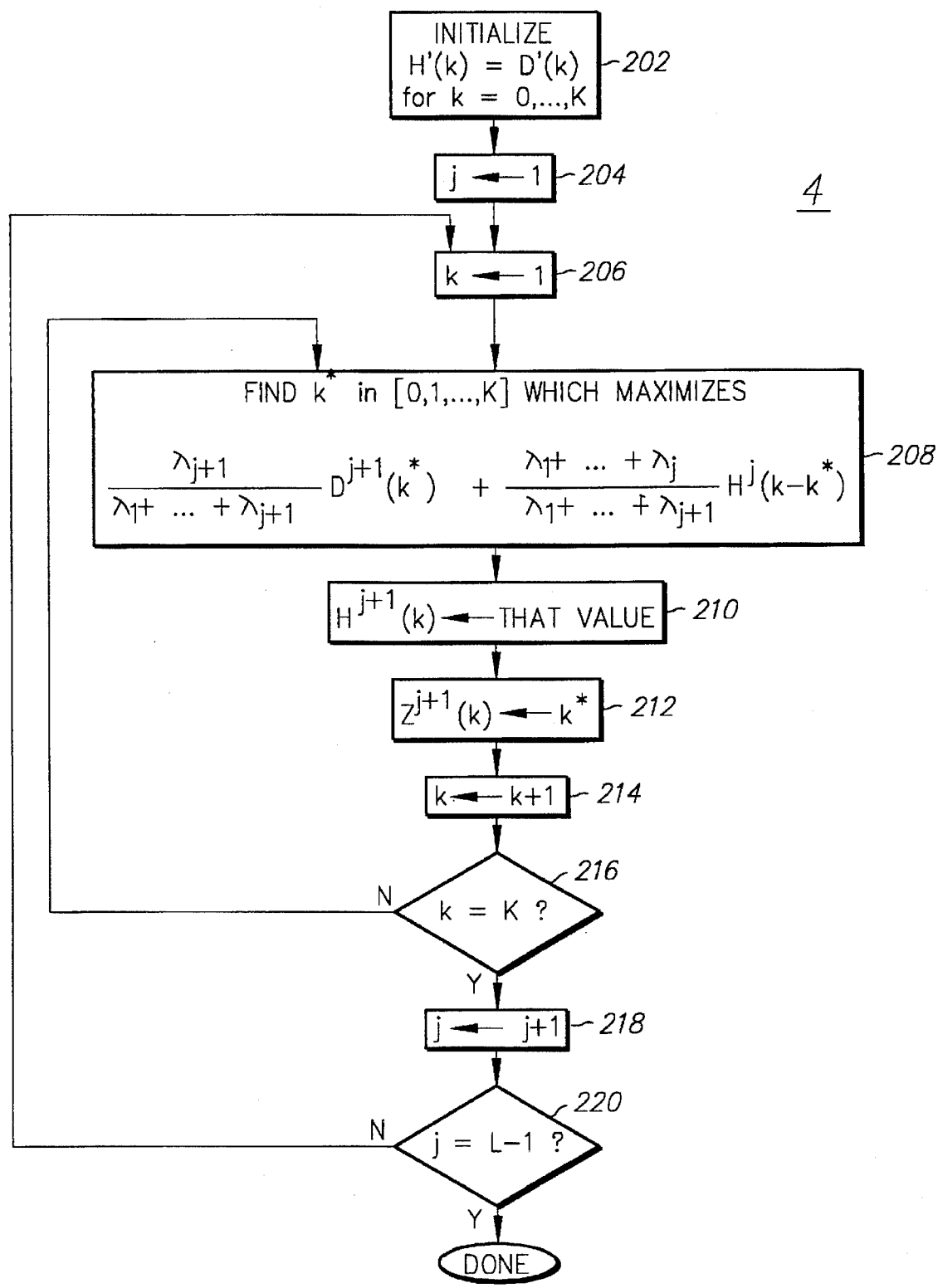
FIG. 3 is a more detailed flowchart of step 4 of FIG. 1.

The above method for making an initial allocation is given in more detail in FIG. 3. As before, let $\lambda_i$ represent the proportion of requests coming from a stream i of the streams $i=1, \ldots, L$. Define Hi(k) as the maximum hit ratio obtainable when k buffers are optimally allocated to streams $1, \ldots, j$, each of the j streams having its own cache. For a given number j of streams and a given number k of buffers, the value of $H^{j+1}(k)$ is given by the expression $$H^{j+1}(k) = \tag{7}$$

$$\max_{k^*=0}^{K} \left( \frac{\lambda_{j+1}}{\lambda_1 + \ldots + \lambda_{j+1}} D^{j+1}(k^*) + \frac{\lambda_1 + \ldots + \lambda_j}{\lambda_1 + \ldots + \lambda_{j+1}} H^j(k-k^*) \right)$$

To obtain the maximum, this expression is evaluated for all values of k*.

This is implemented as shown in FIG. 3. Initially, for all buffers k, $H^1(k)$ is initialized to a value of the depth distribution $D^1(k)$ for the first request stream (step 202). Then, a stream count j is initialized (step 204), and a buffer count k is initialized (step 206).

In a nested loop, values are computed for equation (7) for each k* value from 1 to k (step 208). The maximum of these values is assigned to $H^{k+1}(k)$ (step 210), and the k* value which produces that maximum value for equation (7) is assigned to $Z^{j+1}$ (step 212). The buffer count k is then incremented to move on to the next one of the K buffers (step 214), and a test is made to see whether the last buffer has been processed (step 216). If not, processing goes to step 208 to again maximize equation (7) for the incremented number of buffers.

If so, then processing moves on to step 218, where the stream count j is incremented, and a test is made in step 220 to see whether we have processed the last stream. If so, processing is completed. If not, then processing returns to step 206, where the buffer count is re-initialized, and the next set of buffer assignments is made.

At the conclusion of the execution of this algorithm for all buffers and all streams, the values $K^*_1, K^*_2, \ldots, K^*_L$ denote the optimal allocation to the caches for streams 1, 2, ... L, respectively. They are obtained as follows: $K^*_L = Z^L(K)$, $K^*_{L-1} = Z^{L-1}(K - K^*_L)$, and similarly, for i=2, ..., L-1, $K^*_{L-i} = (K - (K^*_L + K^*_{L-1} + ... + K^*_{L-i-1}))$.

MERGING PAIRS OF REQUEST STREAMS FROM THE INITIAL ALLOCATION

Now that the characterization information has been obtained (step 2), and the initial fully split buffer allocation has been made (step 4), the method of the invention proceeds by merging pairs of request streams and corresponding caches, until a final condition is reached in which the memory resources have been organized into a desired final number of caches, and the request streams are all assigned to the caches. Where more than one request stream are assigned to a given cache, the method of the invention includes superposing those request streams, two at a time.

FIG. 1 shows this remaining portion of the invention in steps 6, 8, and 10. In step 6, using the characterization information obtained in step 2 and the initial, fully split buffer allocation from step 4, step 6 produces measurements for all possible pairs of request streams. For each possible pair, the measurements provide a hit ratio for the overall cache architecture that results from that pairing of streams. It is thus possible to determine which request stream pairing produces the best hit ratio.

In step 8, the two streams whose pairing produces the best hit ratio are superposed, and the requests to memory pages making up the caches for these two streams are merged. Thereafter, the two superposed streams are treated as a single stream, and the merged memory pages are treated as a single cache.

In step 10, the characterization information is updated to reflect the superposed streams. Then, a test is done in step 12 to determine whether the method of the invention is completed. This test may be made based on any suitable completion criterion, such as whether a desired target number of caches has been reached.

PRODUCING MEASUREMENTS FOR STREAM SUPERPOSITIONS

A detailed discussion of steps 6, 8, and 10 of FIG. 1 will now be made. Step 6 is preformed by using the characterization information (depth distribution and burst size) for each individual request stream to obtain a depth distribution for a superposition of any two of the streams. The algorithm for obtaining this superposed depth distribution is called COMBINE. A derivation of the algorithm COMBINE will now be given, followed by further implementation details.

In accordance with the invention, the burst characteristics of the request streams are characterized, so that the burst characteristics may be exploited in the time sharing of the buffer resources, in order to optimize the cache assignment. A preferred way in which to characterize the burst characteristics of two request streams, being considered (in isolation) for superposition, is to measure the mean lengths of the alternate bursts of each type. Requests in stream i are defined as type i requests, and a burst of requests from stream i is defined as a type i burst. Cache behavior under this and further assumptions will then be analyzed.

The burst characteristics of request streams will be analyzed in terms of two stack reference streams $P_1$ and $P_2$. Assuming that these two streams are superposed on a single cache, and that the superposed stream contains alternate bursts of requests from each stream, the miss ratio of the combined stream will be evaluated.

COMPUTING THE INTER-REFERENCE DISTRIBUTION FROM THE DEPTH DISTRIBUTION

To model the interaction between the two streams, the depth distribution characterization of a stack reference process will be transformed to an inter-reference distribution. The inter-reference distribution is defined as the distribution of time between references to a given page. (For simplicity of presentation, it is assumed that each request takes one unit of time. Because of this assumption, measuring distances between requests within a stream is equivalent to measuring elapsed time between those requests.)

If a given number of references to other pages (i.e., a given number of units of time) take place between two references to a given page, then the given page will follow a trajectory downward from the top position of the cache (where it was when it was first referenced) to some depth within the cache, before it returns to the top because of its second reference.

If two references to the given page occur in one stream, a given inter-reference distance apart, then it is then relatively simple to calculate the impact of the interruption of the one stream by a burst from another stream between the two references to the given page, as an increase in inter-reference distance between the two references to the given page. From this increase in inter-reference distance, the depth characterization of the combined stream may be obtained.

To carry out this analysis, the first step is to derive the conditional distribution of the inter-reference distribution of a single stream in isolation. This is obtained as a sum of reciprocals of complementary cumulative depth distribution values (see below).

Consider a single stack reference stream applied to an infinite LRU-managed cache with the stream having depth density function and cumulative distribution function of d() and D(), respectively.

Let $I_i$ be a random variable representing the conditional inter-reference distance of a request, conditioned on its depth being i. That is, since the previous time the page had been requested, and thereby moved into the top cache position, subsequent requests for other pages have caused the page to be moved down to depth i in the cache. (The requested page may or may not be somewhere within the cache. If the page is not in the cache, it is treated as having been found at depth i=∞.)

Then, let $I_i(z)$ be a generating function, or "z-transform," for the conditional inter-reference distance. $I_i(z)$ is a probability generating function, and is given by the expression $$I_i(z) = \sum_{n=0}^{\infty} z^n Pr[I_i = n] \qquad (8)$$

for values of n corresponding with the requests in the trace, and, equivalently, with units of time corresponding with the requests. (In this expression, $Pr[I_i=n]$ is the probability that the condition expressed as the argument of the Pr function (that is, the expression inside the brackets) holds true.)

Also, let $E[I_i]$ be an expected value for the conditional inter-reference distance $I_i$. $E[I_i]$ is given by the expression $$E[I_i] = \sum_{n=0}^{\infty} n Pr[I_i = n] \qquad (9)$$

Additionally, let $R_i$ be a random variable denoting the duration for which the tagged page stays at position i. Also, let $R_i(z)$ and $E[R_i]$ be the generating function and expected value of $R_i$, given by expressions similar in form to equations (8) and (9).

Define, for any x, that $\bar{x}=1-x$, and that $D(0)=0$. By the properties of the stack reference stream, for the page to stay at position i for exactly k time units, there must be k−1 accesses to elements more recently accessed than p (therefore, in higher positions in the cache than p), followed by an access either to p or to a page less recently accessed than p.

Thus, for the stream P, the distribution of $R_i$ is given by $$Pr[R_i=k]=\bar{D}(i-1)D(i-1)^{k-1} \quad (10)$$

where k>1 and i>1. The generating function $R_i(z)$ and the expected value $E[R_i]$ are then given by $$R_i(z) = \frac{z\bar{D}(i-1)}{1-zD(i-1)} \quad (11)$$

and $$E[R_i] = \frac{1}{\bar{D}(i-1)} \quad (12)$$

where i>1 and $\bar{D}(i-1)>0$. These equations are only given for i such that $\bar{D}(i-1)>0$, since the tagged page can never reach locations indexed by other values of i.

After staying at position i, a page may either move to position i+1 (with probability $\bar{D}(i)$) or to position 1 (with probability $d(i)$). Since these events are independent of the duration for which the page stayed at position i, $$Pr[R_i = k|\text{page moves to } i+1] = Pr[R_i = k|\text{page moves to } 1] \quad (13)$$
$$= Pr[R_i = k]$$

(Here, the argument of the probability function Pr[] is as follows: The expression to the left of the vertical bar is the condition whose probability is being evaluated. The expression to the right of the vertical bar is a condition precedent, which is assumed to be true for the evaluation of the expression to the left of the vertical bar. For instance, the first term of equation (13) is the probability that $R_i=k$, given that the page moves to position i+1 of the cache.)

$I_i$ can now be computed by noting that a page that is being retrieved from location i must have started in position 1, and followed the cache trajectory 1, 2, ..., i, as i−1 other pages, deeper in the cache, were subsequently requested. Thus, $I_i$ is given by $R_1+R_2+\ldots+R_i$, where the sum represents a sum of independent random variables.

Next, it follows that, in a stack reference stream with cumulative depth distribution $D()$ and complement $\bar{D}()$, the conditional inter-reference distribution of any page, given that the page is found at depth i, has generating function $$I_i(z) = \prod_{j=1}^{i} R_j(z) = \prod_{j=1}^{i} \frac{z\bar{D}(j-1)}{1-zD(j-1)} \quad (14)$$

where i>1 and $\bar{D}(i-1)>0$; and mean $$E[I_i] = \sum_{j=1}^{i} \frac{1}{\bar{D}(j-1)} \quad (15)$$

where i>1 and $\bar{D}(i-1)>0$. It is useful to check that if $D(K-1)<1$ and $D(K)=1$, then $$\sum_{j=1}^{K} E[I_i]d(i) = K \quad (16)$$

That is, the expected inter-reference distance for any page is K, which is a well known (unconditional) property for a stack reference stream. See Coffman et al.

THE EFFECT OF STREAM SUPERPOSITION ON INTER-REFERENCE DISTRIBUTION

Given the inter-reference distribution as derived above, the next step is to compute the effect of stream superposition on the inter-reference distribution of an arbitrary page from one of the streams. This is done taking into consideration both the depth characterization of the individual streams and the switching process between them.

In achieving the objective of making cache assignments so as to optimize the cache request hit ratio, this analysis will be used many times as a component of an optimization procedure. Thus, computational efficiency is important. The method for doing this will be to replace several random variables by deterministic versions with the correct mean.

Consider again the two stack request streams $P_1$ and $P_2$, having depth distribution functions $d^1()$ and $d^2()$, and cumulative distribution functions $D^1()$ and $D^2()$. Assume that $P_1$ and $P_2$ are superposed to form a single stream P. This combined stream will consist of alternating bursts of requests for each type of page, where "type" is used to refer to which stream the requests for that page came from. Let $b_1$ and $b_2$ be the expected size of type 1 and type 2 bursts in P. These can be obtained directly from the matrix M described above. Referring to the terms of the matrix M, the expected burst size $b_1$ equals the matrix element $M_{1,2}$, and the expected burst size $b_2$ equals the matrix element $M_{2,1}$.

Consider an arbitrary type 1 page, denoted $p_1$, which is found in the simulated cache for the request stream $P_1$ at a depth $D_1<\infty$. Also let $R_1$ denote the inter-reference distance of the page $p_1$ in the stream $P_1$. Similarly, let D and R denote the depth and inter-reference distance of $p_1$ in the combined stream P. In accordance with the invention, D and R are to be obtained, and from them, the statistics of the superposed stream are computed.

First, from the depth distribution $d^1()$ and the analysis of the previous section, the inter-reference distribution of $p_1$ within $P_1$, i.e., $R_1$, is known. To reduce the computational complexity, $R_1$ is taken as a deterministic random variable with its correct mean. Thus, $$R_1=E[I_{D_1}] \quad (17)$$

with probability 1.

Next, to derive the depth and inter-reference distance of $p_1$ within P, the number of type 2 requests (denoted N) which have been made between the two successive requests for $p_1$ is obtained. Again here, it is assumed that the burst lengths are deterministic. That is, all type 1 bursts are of the same size, and all type 2 bursts are of the same size (given by $b_1$ and $b_2$, respectively). Since $p_1$ is an arbitrarily chosen page, its location within the (type 1) burst is uniformly distributed.

Note that these deterministic assumptions are somewhat well motivated in database systems, because cyclic references to all pages within a table (known as tablescans), are commonplace. For instance, they occur in the nested-loop join procedure of relational database.

Under the above assumptions, the value of N is either $$b_2 \left\lfloor \frac{R_1}{b_1} \right\rfloor \quad (18)$$

with probability $$1 - \frac{R_1}{b_1} + \left\lfloor \frac{R_1}{b_1} \right\rfloor \quad (20)$$

-continued or $$b_2 \left(1 + \left\lfloor \frac{R_1}{b_1} \right\rfloor \right) \quad (19)$$

with probability $$\frac{R_1}{b_1} - \left\lfloor \frac{R_1}{b_1} \right\rfloor \quad (21)$$

Thus, the distance of $p_1$ within the combined stream P is approximated, respectively, by $$Pr\left[R = R_1 + b_2 \left\lfloor \frac{R_1}{b_1} \right\rfloor \right] = 1 - \frac{R_1}{b_1} + \left\lfloor \frac{R_1}{b_1} \right\rfloor \quad (22)$$

or $$Pr\left[R = R_1 + b_2 \left(1 + \left\lfloor \frac{R_1}{b_1} \right\rfloor \right) \right] = \frac{R_1}{b_1} - \left\lfloor \frac{R_1}{b_1} \right\rfloor \quad (23)$$

The evaluation of D is similar to that of R. The distinction is that, in this derivation, we must account for the number of distinct type-2 pages that have been requested, between the previous request and the most recent request of $p_1$ (this number is denoted as N').

DERIVING THE NUMBER OF DISTINCT REQUESTS IN A STEAM

A simple recursion has been derived for computing the probability, in terms of N', that a sequence of N requests contains N' distinct requests, where N'<N. An approximated value of N' can be derived by noting that the ratio between N' and N tends to (for large values of N) the probability that a type-2 page is found at depth infinity (that is, outside the cache) at $P_2$, i.e., at $d^2(\infty)$. Thus, $$N' \approx N d^2(\infty) \quad (24)$$

This limit can be understood by realizing that $d^2(\infty)$ is the rate of introduction of new type 2 elements into the cache.

From Equation (19) the depth of $p_1$ within P is thus approximated by:

$$Pr\left[D = D_1 + b_2 \left\lfloor \frac{R_1}{b_1} \right\rfloor d^2(\infty) \right] = 1 - \frac{R_1}{b_1} + \left\lfloor \frac{R_1}{b_1} \right\rfloor \quad (25)$$

or $$Pr\left[D = D_1 + b_2 \left(1 + \left\lfloor \frac{R_1}{b_1} \right\rfloor \right) d^2(\infty) \right] = \frac{R_1}{b_1} - \left\lfloor \frac{R_1}{b_1} \right\rfloor \quad (26)$$

THE "COMBINE" ALGORITHM: SUPERPOSING TWO REQUEST STREAMS

The analysis given above yields a simple algorithm for approximating the depth distribution of the superposition of two stack depth streams from their individual depth distributions and their burst sizes. Assume that $d^i(n)$, where i=1,2, is defined for 1<n<K, and for n=∞. The process for computing the depth distribution of stream 1 requests within the superposed process is given here. This algorithm, which is used extensively in optimizing request stream assignments to caches according to the invention (see step 6 of FIG. 1), is referred to as COMBINE.

The COMBINE algorithm is as follows:
1. Use Equation (15) for computing $E[I_i]$, where i=1, ..., K. In Equation (15), d() and D() are replaced by $d^1()$ and $D^1()$, respectively.

2. For $D_i=1, \ldots, K$, use Equation (25) and (26), (in which $R_1$ is substituted by $E[I_{D1}]$) to compute the depth distribution of stream 1 requests within the combined stream.

Similar steps are used to compute the depth distribution of stream 2 requests within the superposed stream. Denote the resulting depth distribution, as seen by Stream 1 requests in the superposed stream, as $S^1()$, and the corresponding distribution for Stream 2 as $S^2()$. Then, the resulting depth distribution for the combined stream is given by $$D^{1,2}(k) = \frac{\lambda_1}{\lambda_1 + \lambda_2} S^1(k) + \frac{\lambda_2}{\lambda_1 + \lambda_2} S^2(k) \quad (27)$$

for k=1, ... K. Similarly, for arbitrary streams i, j, $D^{ij}(k)$ is obtained for k=1, ..., K.

It is clear that Algorithm COMBINE requires O(K) operations. Note that the results of step 1 above can be used for superposing Stream 1 with any other stream. Thus, if one examines the superposition of Stream 1 with several alternative streams, step 1 for stream 1 needs to be executed only once.

IMPLEMENTATION OF THE ABOVE IN FIG. 1

The implementation of the above in FIG. 1 will now be discussed. Step 6 of FIG. 1 employs the characterization information obtained in steps 2 and 4 to produce measurements for all possible superpositions of two of the request streams. Step 6 uses the COMBINE algorithm as derived above. The implementation of Step 6 is given in more detail in the flowchart of FIG. 4.

Essentially, step 6 is implemented by executing the algorithm COMBINE for each possible pair of request streams, taking the characterization information as inputs and producing a measurement, in the form of a depth distribution, for a proposed superposition of the two streams. From the resultant depth distribution, a hit ratio is obtained by $D^{ij}(k)$ as given above. One of the possible pairs of streams yields the best hit ratio when superposed. This is indicated by the minimization of the quantity $$\lambda_i D^i(k_i) + \lambda_j D^j(k_j) - (\lambda_i + \lambda_j) D^{ij}(K_i + k_j) \quad (28)$$

where $k_i$ and $k_j$ are the sizes of the optimally fully split caches obtained from the procedure of FIG. 3. The two streams which, when superposed, yield that best hit ratio are in fact superposed.

A suitable programming technique for checking all possible pairs of a finite set of request streams will be known to a person of ordinary skill in the art, and will therefore not be elaborated upon here. Therefore, FIG. 4 begins by selecting one of the possible pairs of request streams (step 302). For that selected pair of streams, designated i and j, a combined depth distribution is obtained as follows: The algorithm COMBINE and equation (27) are used to compute the combined depth distribution of this pair of request streams (step 304). Then, equation (28) is used to estimate the improvement brought about by superposing streams i and j (step 306).

Next, using straightforward programming techniques, a check is made to see if the resultant improvement is better than that found so far for any other superposition (step 310). If so, then that pairing of streams is saved (step 312). Then, a test is made to see if any pairs of streams remain to be tested (step 314). If so, processing returns to step 302, and the next pair of streams is tested. If not, then step 6 is finished.

SUMMARY OF THE BUFFER ALLOCATION AND CACHE ASSIGNMENT METHOD OF THE INVENTION

A summary of the method according to the invention for efficient buffer allocation and cache assignment is now presented. The input of the algorithm is a trace of the combined page request stream, and the number of cache buffers to be allocated. The output is the assignment of streams to cache pools and allocation of buffers to the pools. The trace is an ordered sequence which provides for every request two identifiers: 1) the page identifier, and 2) the stream identifier. (In a database application a stream identifier might reflect the identification of a table or index. In a processor application it might reflect a process identifier and whether the request is for an instruction or data word.)

Several procedures or algorithms are used as steps for the method of the invention. These are described separately, under separate subheadings. Finally, using these steps, the complete algorithm is summarized.

ALGORITHM ONE: COMPUTE DEPTH DISTRIBUTION

There is given a trace, i.e., a finite sequence, designated P, which is made up of R number of page requests, $P=p_1, p_2, \ldots p_R$, from N request streams. Each page request is expressed as $p_i=(t_i, m_i)$, where $t_i$ is the stream index (identifying which of the N streams the request originated from, for $1<t_i<N$,) and $m_i$ is the page index, identifying which page of mass storage is being requested. It is assumed that the individual streams are mutually exclusive, so no page is ever requested by two different streams. That is, if two requests are from two different streams ($t_i \neq t_j$), then they are not both requesting the same page of mass storiage (i.e., $m_i \neq m_j$).

The projection a given stream $P^t$ of P on $t(1<t<N)$ is defined as $P^t=\{p_i|t_i=t\}$. In other words, $P^t$ is the t-th stream. Let $T \subset \{1,\ldots,N\}$ be a subset of the streams. The projection of P on the set T, designated $P^T$, is defined as $P^T=\{p_i|t_i \in T\}$.

Given the stream P, it is required to compute the depth statistics of $P^t$ (the projection of P on t), for $1<t<N$.

This computation is done by simulating a system of N number of LRU caches. The simulation is done by constructing N data structures representing the N caches, and inserting $p_i$ into the cache $t_i$ according to the LRU scheme, while recording the depth at which $p_i$ is found (or recording a depth of $\infty$ if $p_i$ is not found). The size of each of the caches used in the simulation can be bounded from above by K, the number of buffers to be allocated by the optimization algorithm (note that using a larger cache is redundant). To efficiently implement a cache as shown in FIG. 2, note that the following operations must be performed:

1. Finding $p_i$ in the cache, if present.
2. Inserting $p_i$ at position 1 while shifting a group of pages (those that were deeper than $p_i$ when found) one position deeper.

The following structures can be used to achieve an efficient simulation:

1. Construct a 2—3 tree (or AVL tree), in Which the leaves represent the pages in the cache, ordered according to the same order as in the cache. The keys (internal nodes) in this tree are the page positions within the cache. See, for instance, Aho, Hopcraft, and Ullman, "Data Structures and Algorithms," Addison Wesley, 1983.
2. Construct a hash table in which the keys are the page identifiers, and each of whose elements points to the corresponding leaf in the 2–3 tree. See Aho et al.

A search for a page on these structures is done via the hash table, while the restructuring of the cache is done using the 2–3 tree. The time complexity of simulating a trace of length R request is therefore O(R log K).

ALGORITHM TWO: COMPUTE EXPECTED BURST SIZE

Given the finite page request sequence P of length R, including requests from N streams, it is required to find, for every two streams $t_a$ and $t_b$ ($1<t_a$, $t_b<N$, $t_a \neq t_b$), the mean burst size of each of the two page types within the sequence $P^{\{t_a \cup t_b\}}$. This computation is done, as described above in FIG. 2, for all pairs of streams $t_a$ and $t_b$ using a single run over P. The results are represented as a matrix of expected burst sizes for all possible pairs of streams. This matrix effectively summarizes the interaction between streams resulting from superposition of the various possible combinations of streams. The time complexity of this process is O(RN).

ALGORITHM THREE: DETERMINE OPTIMAL BUFFER ALLOCATION FOR INITIAL, FULLY SPLIT CACHE ASSIGNMENT

Consider a system consisting of L caches and L page request streams. Let the depth distribution of process $1<i<L$ be $D^i()$, and $\lambda_i$ be the proportion of requests coming from stream i. Assume that cache i is assigned to process i and that the total number of buffers in the system is $K>0$. It is required to find an optimal buffer allocation $K_1^*, \ldots, K_L^*$, where $$\sum_{i=1}^{L} K_i^* \leq K \qquad (29)$$

and $K_i^*>0$, which maximizes the hit ratio. In other words, $K_1^*, \ldots, K_L^*$ is an optimal allocation if, for any other allocation $K_1, \ldots, K_L$, where $$\sum_{i=1}^{L} K_i \leq K \qquad (30)$$

and $K_i>0$, it will be true that $$\sum_{i=1}^{L} \lambda_i D^i(K_i^*) \geq \sum_{i=1}^{L} \lambda_i D^i(K_i) \qquad (31)$$

The optimal solution of this problem can be found using the simple dynamic programming technique given in FIG. 3 The time complexity of this algorithm is $O(K^2 L)$.

SUMMARY OF THE CACHE ASSIGNMENT ALGORITHM

Given the sequence P consisting of page requests originating from N different streams, the total number of buffers K, and the number of caches, $N_c<N$, it is required to find an efficient assignment of each of the tables to one of the caches and an allocation $$K_1, K_2, \ldots, K_{N_c}$$

of the buffers to the caches. The method of the invention, elaborated upon above, will now be concisely summarized.

Figure 4:
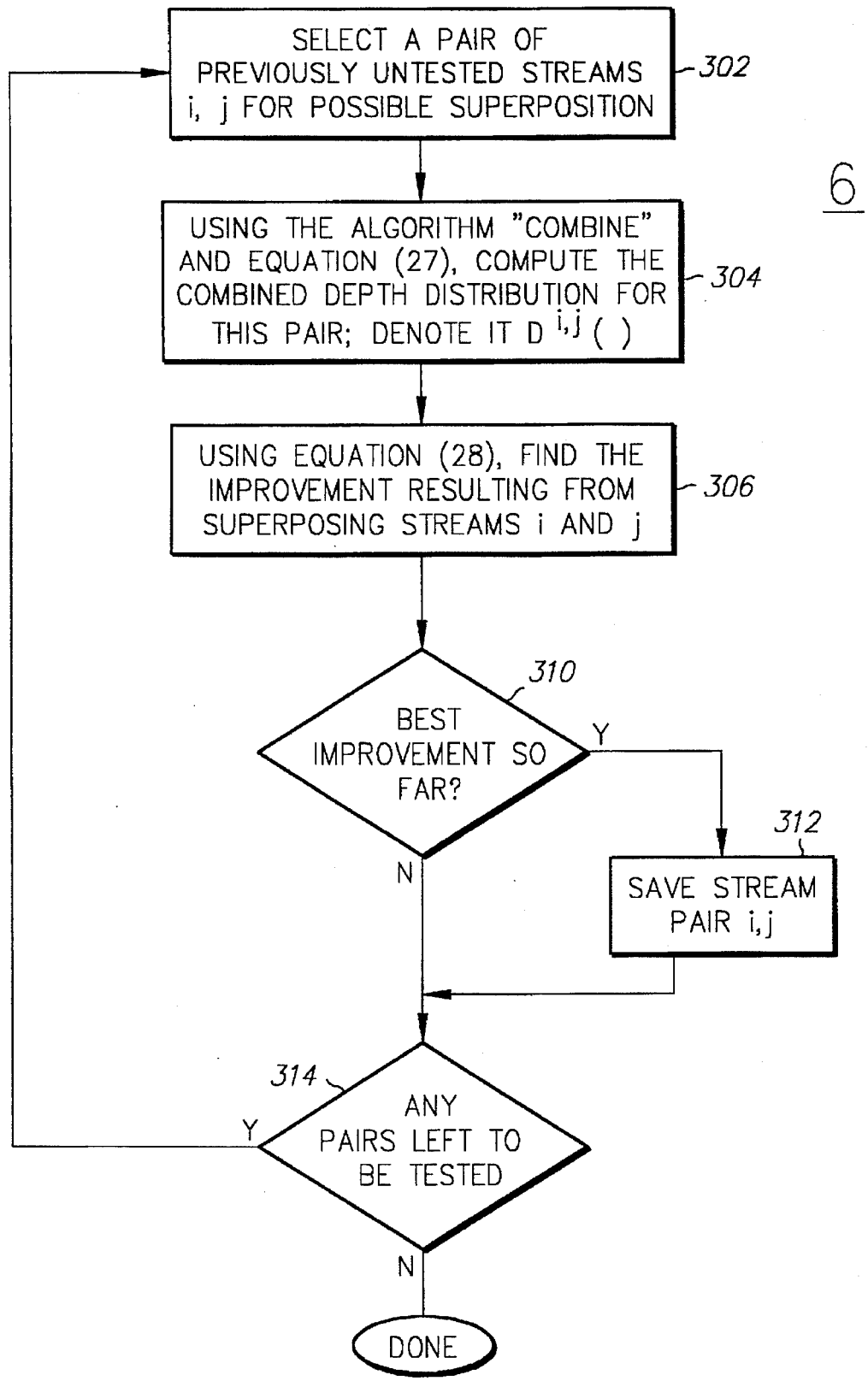
FIG. 4 is a more detailed flowchart of step 6 of FIG. 1.

The algorithm of the invention is a greedy algorithm, shown in FIG. 4, that starts from a completely split architecture (each of the N streams is directed to a separate cache) and repeatedly applies a selective superposition of two streams until the number of streams and caches reaches $N_C$.

An outline of the algorithm is as follows: Initially, a representative trace is obtained from the system for which cache assignments are to be made. Algorithm 1 is used to efficiently find the depth distributions of each type from this trace. Algorithm 2 is used to obtain the burst lengths of any pair of streams when superposed. Then Algorithm 3 is applied to provide the optimal buffer allocation for $N_C=N$ (the fully split case).

Algorithm COMBINE is then used to estimate the depth distribution resulting from the superposition of any two of the N streams. A comparison of the hit ratio of the superposed stream with that of the two separate streams is used as a measure for evaluating the poteitial payoff resulting from combining the two streams. This is done for all $N(N-1)/2$ pairs to find the best two candidates for merging. Note the value of doing this via the fast approximate scheme embodied in COMBINE, rather than processing the whole trace again. After merging these two streams, the whole process is repeated with the resulting N-1 streams.

The complete cache assignment algorithm is thus:
CACHE ASSIGNMENT Algorithm

1. Apply Algorithm 1 to P, and compute the cumulative depth distribution ($D^i()$) of each of the N streams.
2. Apply Algorithm 2 to compute the expected burst size of each stream within every pair of streams.
3. Using the $D^i()$, i=1, ..., N, apply Algorithm 3 to compute the optimal fully split buffer allocation. Let $K_i^*$ denote the allocation to stream i.
4. Using Algorithm COMBINE, compute the (approximated) depth distribution of all streams resulting from merging every pair of streams. Let $D^{ij}()$ denote the cumulative depth distribution of the resulting stream when streams i and j are superposed.
5. For every $1<i$, and $j<N$, where $i \neq j$, compute $$\lambda_i D^i(K_i) + \lambda_j D^j(K_j) - (\lambda_i + \lambda_j) D^{ij}(K_i + K_j).$$

This is an approximation for the decrease in number of misses if streams i and j are superposed. Let i* and j* be the values of i, j which maximize the difference.

6. Merge i* and j* into one stream, say i*. Update all required data structures (depth distributions and burst lengths), reapply Algorithm 3, set N:=N-1, and rename stream indices. If $N=N_C$, then stop. Otherwise go to step (5).

A variation on the above algorithm in step 6 is to recalculate the depth distributions and burst lengths, and reapply Algorithm 3, only occasionally (i.e., after several merge steps). This will speed up the algorithm at the possible expense of some reduced performance.

EXPERIMENTAL RESULTS

To examine the performance of the method of the invention, an experiment was conducted, in which the method of the invention was used to determine an efficient buffer allocation for the database system DB2. See IBM Systems Journal, Vol. 23, No. 2 (1984). DB2 allows multiple buffer pools, and allows the user to specify which objects (tables or indexes) are assigned to which buffer pools. Thus, all the requests coming to one object are considered to be one stream, and the problem is to determine which buffer pools to which the requests are to be assigned.

A large database installation running a mix of simple transaction and complex queries was used. Initially, the system was configured so all tables and indexes were applied to a single large buffer pool. A low overhead tracing facility was used to collect every logical I/O made to this buffer pool, resulting in a trace of 458,213 page requests directed to 47 objects. This trace was then fed into the cache assignment algorithm of the invention, to determine an efficient object to buffer pool assignment and buffer pool sizing. Then, the buffer pool in the DB2 system was configured, following the algorithm's recommendation, and the same workload was applied to this configuration.

In this experiment, two questions were examined:
(1) The accuracy of the superposition approximation in predicting the depth distribution (hit ratio function) for mixed streams, and
(2) The quality of the cache assignment (and buffer allocation) proposed by the cache assignment algorithm.

The results of these examinations are reported separately.

EVALUATION OF THE SUPERPOSITION APPROXIMATION

Of the 47 individual streams that constitute the combined page request stream, various pairs were selected, and the quality of the superposition analysis was examined. Three representative pairs are reported here. For each pair, the cumulative depth distribution function is computed, i.e., the hit ratio as a function of the number of buffers, when the two streams combined are applied to a single cache. This measure is derived using three procedures:

1. Exact: The exact cumulative depth distribution, computed by the expensive process of simulating the application of the two table superposed stream to a joint cache buffer. Note that the precise superposition of the requests of these two streams can be extracted by projection from the 47 table streams.
2. Bursty Stream Approximation: The approximation of the two table superposed stream depth distribution as discussed above.
3. Bernoulli Approximation: The approximation of the two table superposed stream depth distribution using a model which assumes Bernoulli switching between the streams as per Morris, "Analysis of Superposition of Streams into a Cache Buffer," ACM Sigmetrics '93, Santa Clara, Calif., May 1993. This derivation would be exact if the streams were combined according to a Bernoulli process. The Bernoulli assumption has been shown to be acceptable if, for example, the index and the data streams are superposed, and in general when the length of bursts is small compared to buffer size. However, it may not be accurate when considering objects, such as an individual table, that may only be used once in a while.

Figure 5:
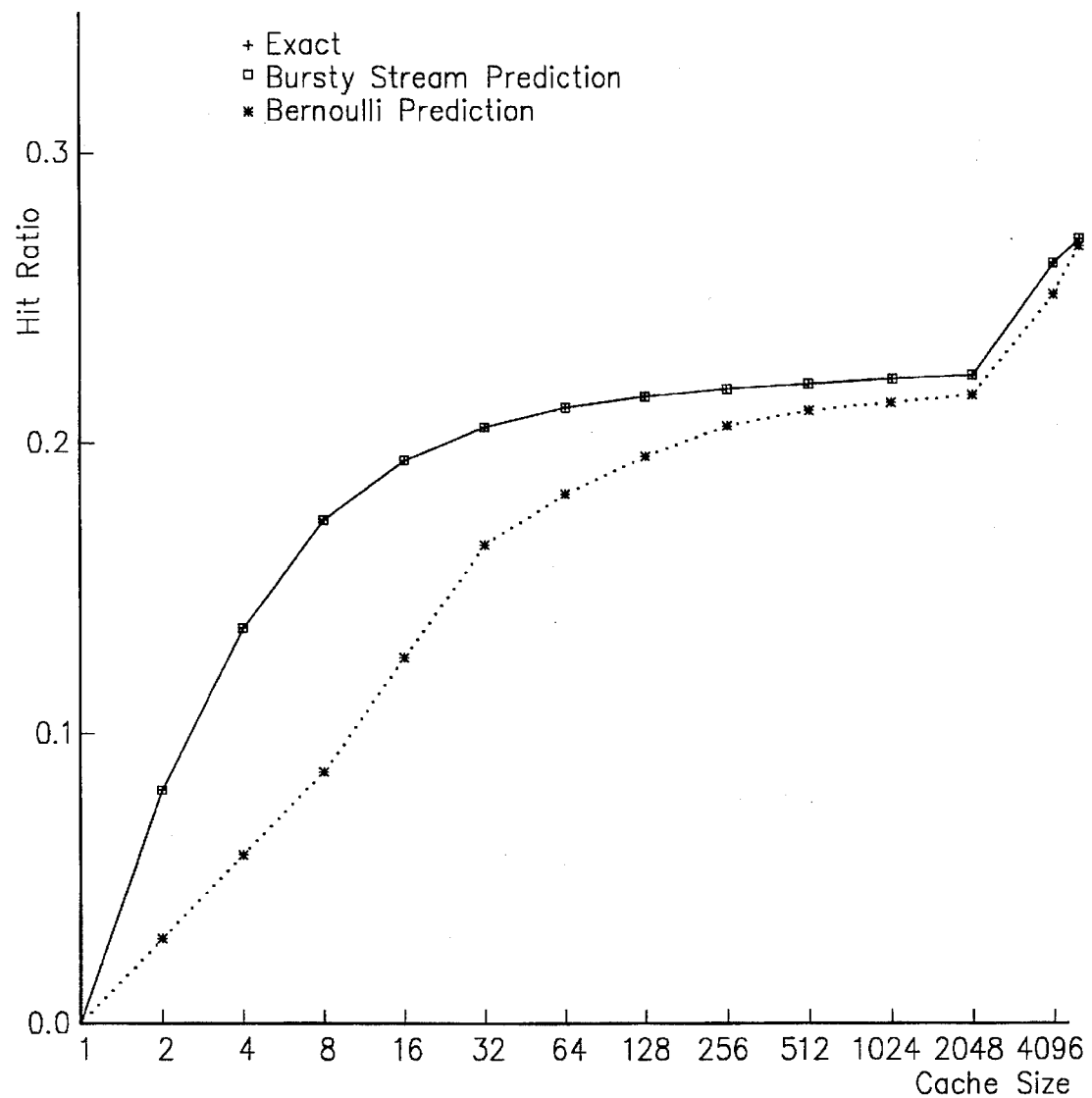
FIGS. 5, 6, 7, 8, 9, and 10 are graphs showing the results of performance tests of the method of the invention.

FIG. 5 depicts the results for merging streams 28 and 41, of the 47 streams. The burstiness of these streams is extremely large with respect to reasonable buffer sizes; in fact they do not overlap. The burst size is 10410 for stream 28 and 3203 for stream 41. The deterministic superposition approximation performs extremely well at this case, while the Bernoulli approximation performs poorly.

Figure 6:
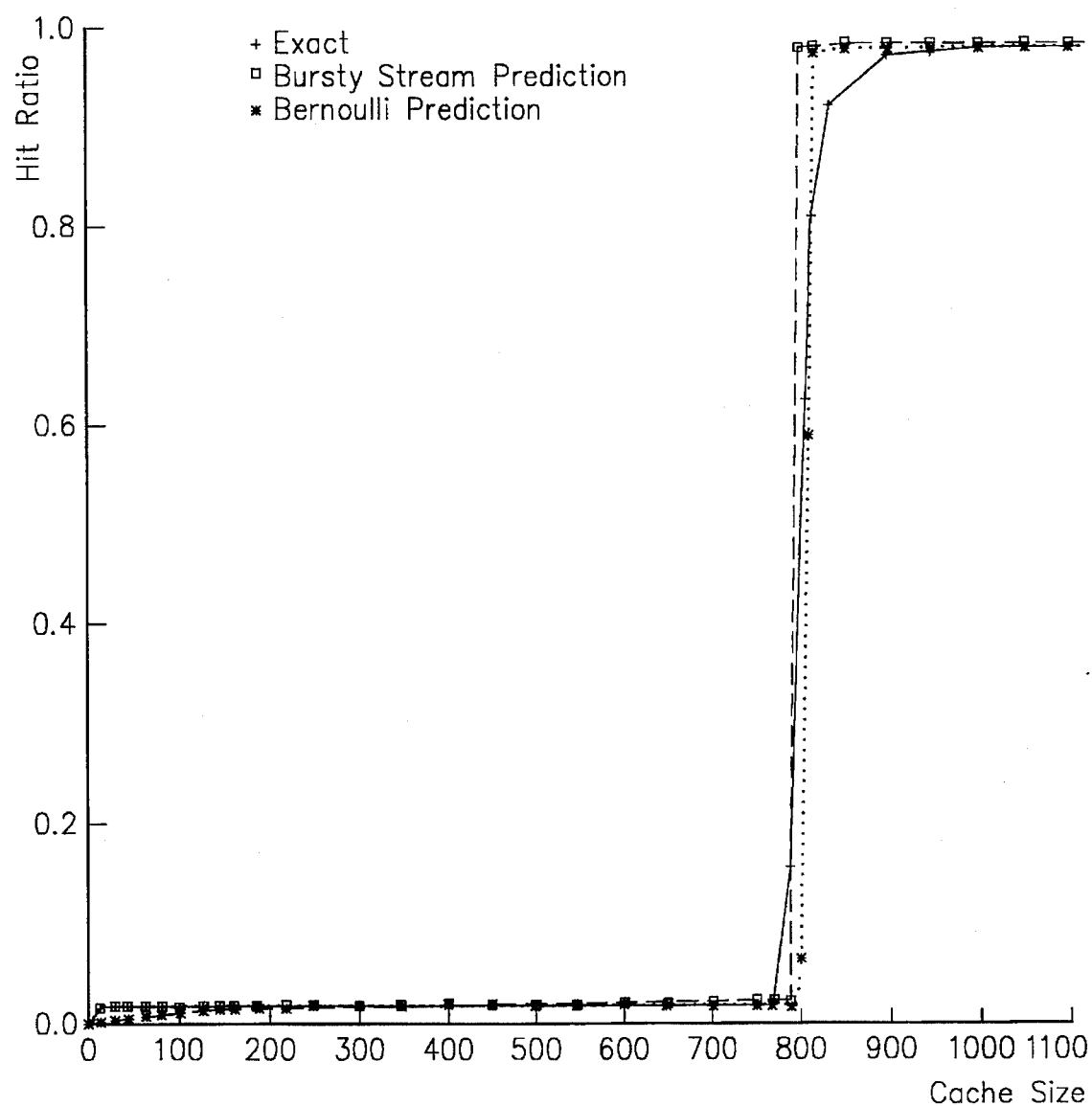
Figure 7:
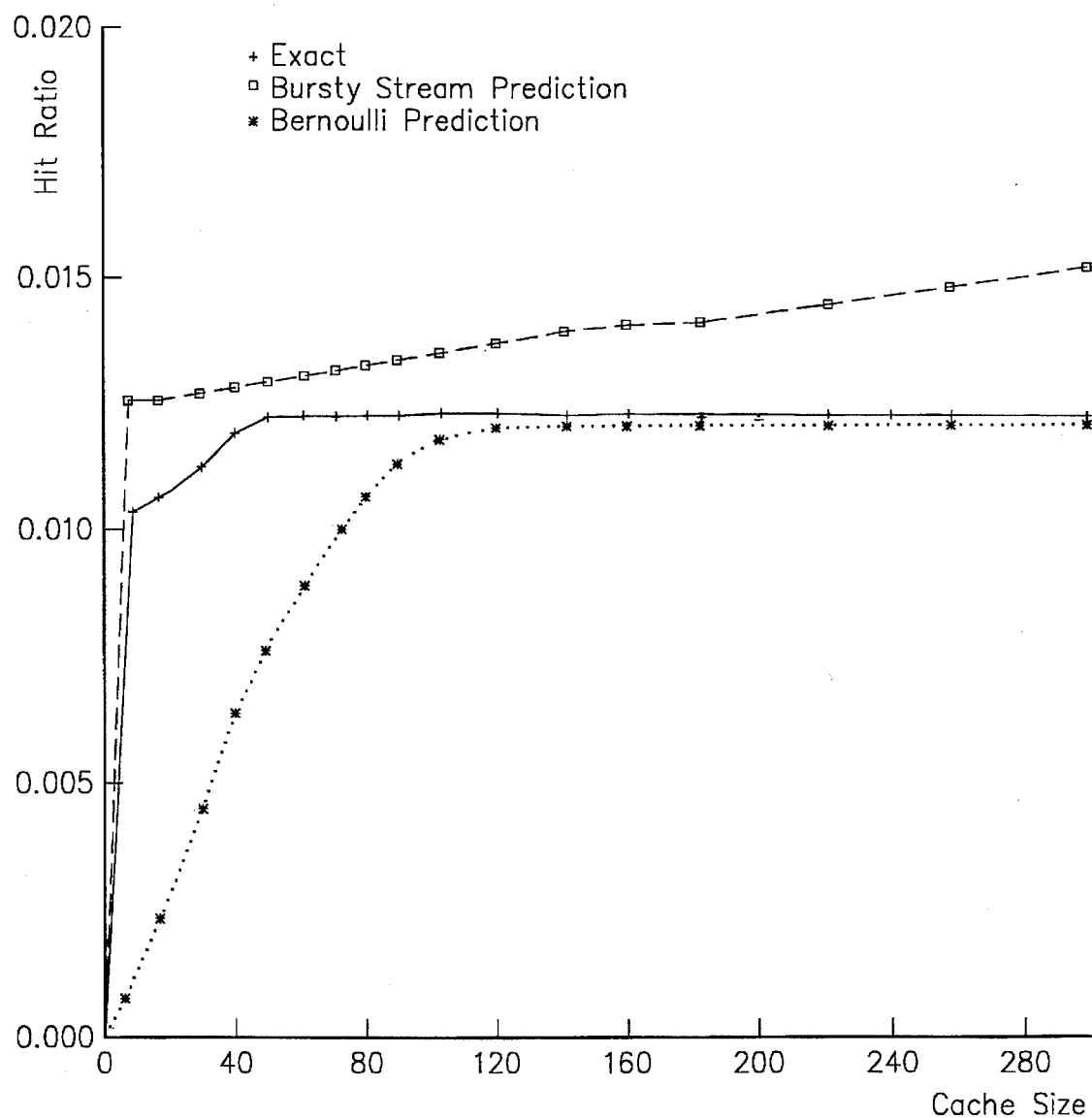

FIGS. 6 and 7 depict the results for merging streams 1 and 30. The amount of intermixing here is high, and the expected burst sizes are about 5 for stream 1, and 114 for stream 30. Stream 1 contains 4332 requests, while stream 30 contains 99695 requests. Both predictions deviate somewhat from the exact results in some regions, but predict the "jumps" in the curve properly. Note that the Bernoulli approximation is quite poor for small buffer sizes (less than 120). This results from not accounting for the burst size of stream 30 which tends to "flush" a small cache.

Figure 8:
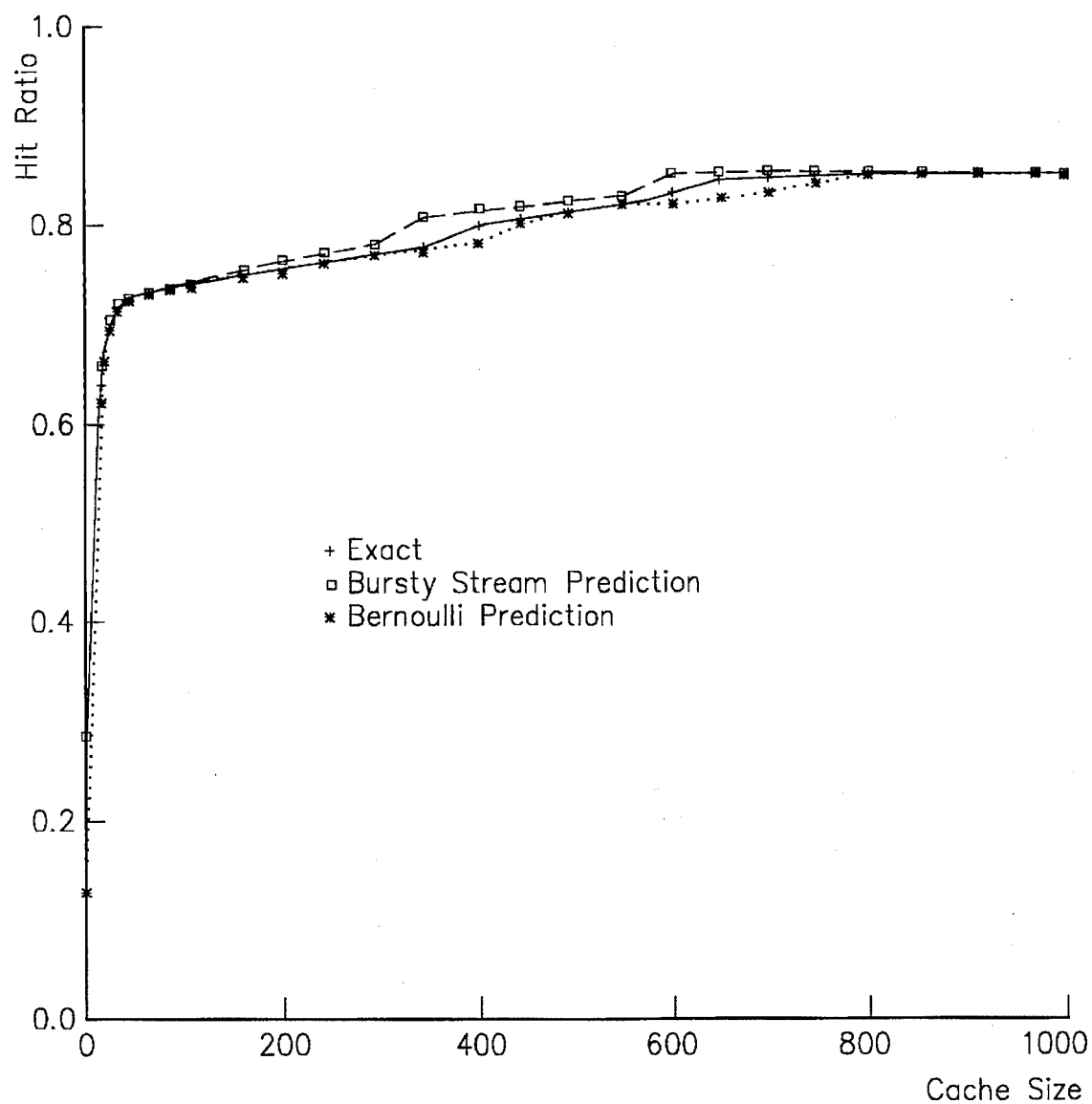
Figure 9:
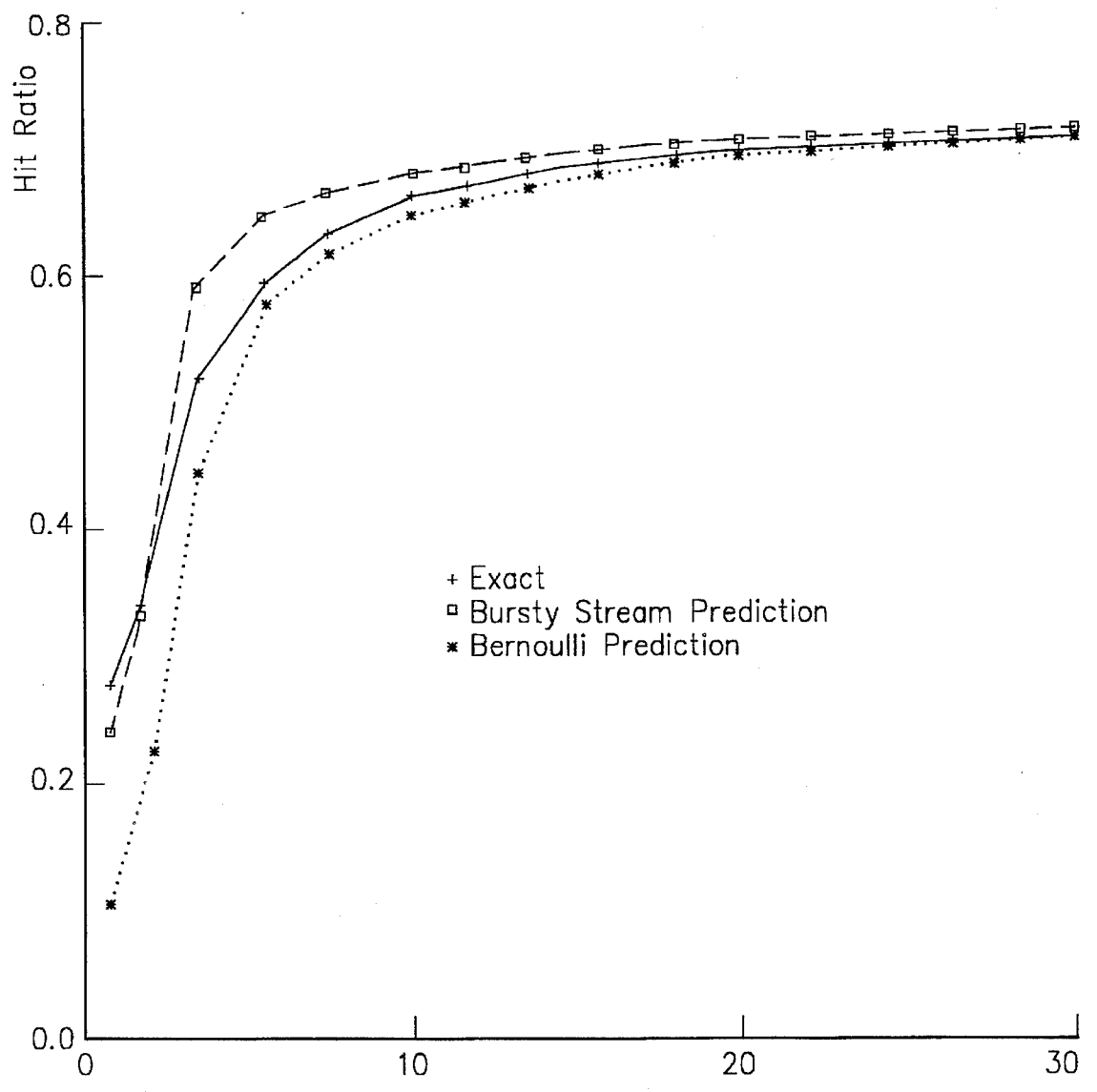

A case where burstiness is not so important is found in the case of streams 16 and 32. FIGS. 8 and 9 depict the results for superposing these streams. The expected burst sizes are about 12 and 11 (the number of page requests in the streams are 3624 and 3100). Not surprisingly, both the deterministic and the Bernoulli approximations perform quite well, except at very small cache sizes, where the method of the invention is superior.

From these examples, it may be concluded that the bursty stream superposition approximation predicts the hit ratio in the superposed stream quite well, and it serves the optimization procedure well by properly predicting the major characteristics (e.g., jumps) of the hit ratio curve. The Bernoulli approximation is shown not to have adequate performance for this particular application. Indeed, because of the optimality of fully split assignment, it would not be applicable to the cache assignment optimization procedure.

EVALUATION OF THE CACHE ASSIGNMENT ALGORITHM

The quality of the cache assignment algorithm is tested in two ways. First, it is applied to the data at hand, and it is determined whether it is able to obtain an improvement over the fully split arrangement. To see if the resulting recommendations are useful, it is compared to a procedure by which random streams are chosen to be combined. Second, after obtaining the recommended cache assignments, the DB2 system is reconfigured to use these assignments, and it is determined whether any performance improvement results.

SIMULATION RESULTS

Out of the 458,213 page requests in this experiment, 230,620 were found to be "compulsory misses", or "cold start misses" as described in Smith, "Cache Memories," ACM Computing Surveys, Vol. 14, No. 3, September 1982, pp. 473–530, in the sense that, regardless of the cache assignment strategy, these requests will end up with a miss; that is, this is the first time the page is requested in the trace. The number of compulsory misses may have been able to be reduced by using a longer trace. The evaluation of the algorithm is therefore based on the number of misses it achieves, out of the remaining 227,593 requests. The number of such misses, when applying the page request stream to a simulation of a single shared cache with 5000 pages, was 30,927 (13.6%). Then, the cache assignment method of the invention was run to determine an efficient assignment of the tables to 3 buffer pools, still using a total buffer size of 5000 pages. The number of non-compulsory misses under this assignment was 4,909 (2.16%).

Figure 10:
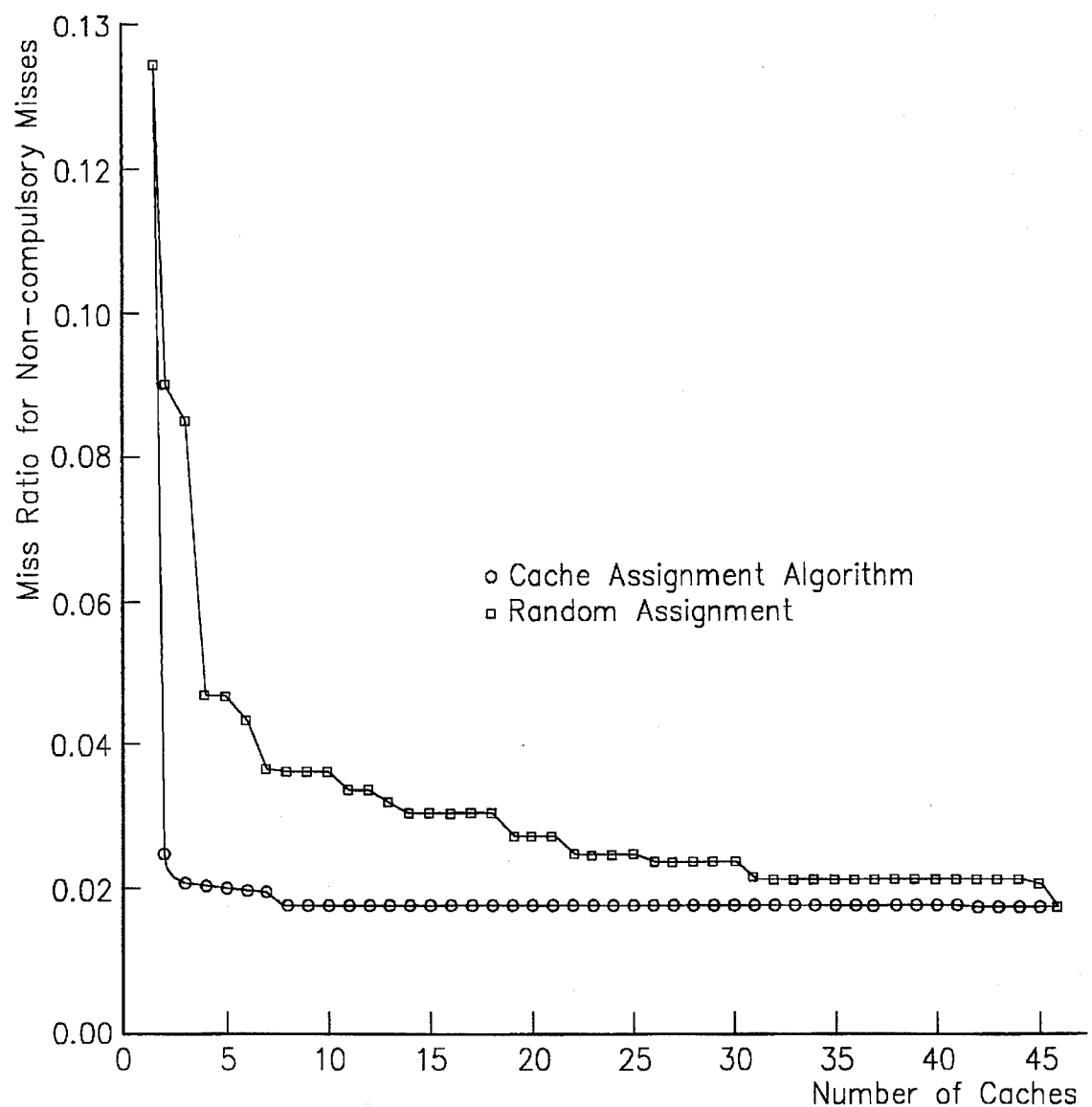

The method of the invention was also run to determine an assignment for a cache consisting of n=2, 3, . . . , 47 buffer pools. FIG. 10 depicts the miss ratio (as fraction of the non-compulsory misses) for the cache assignments derived by the algorithm as function of the number of buffer pools. The rightmost point represents the fully split assignment, while the left most point represents the fully shared assignment. Also depicted in FIG. 10 are the same measures for an algorithm which combined the cache pairs at random. FIG. 10 represents a case in which the total number of buffers allocated is 5000.

FIG. 10 shows that splitting the cache into a small number of pools (about three), leads to a significant performance improvement, i.e., a significant reduction in miss ratio. Proper cache assignment plays a major role in this improvement. The number of non-compulsory misses under the random assignment configuration is up to four times higher than that under the assignment of the algorithm, although in practice this improvement will be diluted by the effect of compulsory misses.

It is believed that an administrator would preferably not want to use more than two or three buffer pools, even though DB2 in its Version 3.1 does allow 60 buffer pools to be used. A larger number would allow only marginal improvement, but may introduce excessive dependence on the trace data input to the analysis. In other words, it would be expected that a two or three cache solution would be more robust.

DBMS LAB TEST

The trace used in the experiments described above was obtained from the DB2 Database Management System running a realistic workload under realistic conditions. In order to see whether the recommendations were practically useful, and would actually improve performance, the recommendations for the cache assignment by reconfiguring the DB2 buffer pools were adopted. Note that the term "DB2 buffer pools" is being used synonymously with "caches." DB2 was run, both with a single shared buffer pool and with three buffer pools with objects assigned to these buffer pools according to the results of the experiments described above.

Details of the setup and the raw results are as follows: The DB2 laboratory experiments were conducted using an an IBM 4381 - T92 processor running DB2 Version 2.3, MVS/ESA 4.2, and IMS/ESA 3.1 as the Transaction Manager. The applications accessed 47 objects: 24 indexes, 19 tables, 3 catalog files and 1 DB2 workfile table. The total amount of data for the 43 objects (not including the workfile and catalogs) was approximately 1.5 gigabytes.

TABLE 1

| Experimental Results | | | |
|---|---|---|---|
| | BASE 1 POOL | MODEL 3 POOLS | % CHANGE |
| ELAPSED RUN TIME (SECONDS) | 1216 | 1240 | |
| CPU UTILIZATION | 89.7 | 91.8 | |
| TRANSACTION THROUGHPUT (PER SECOND) | 6.7 | 7.1 | |
| I/Os PER TRANSACTION | 3.1 | 2.2 | +6% |
| SYNCHRONOUS (NON-PREFETCH) I/Os PER QUERY | 987 | 800 | −29% |
| AVERAGE QUERY ELAPSED TIME (SECONDS) | 236 | 240 | |
| TOTAL NUMBER OF SYNCHRONOUS READ I/Os | 30602 | 23531 | |
| TOTAL NUMBER OF PAGES READ | 285423 | 263825 | |

The workload for the experiments was a mix of transactions and complex query. The transactions were 6 IMS applications accessing 26 objects, and the query applications were read-only and accessed 17 different objects. The application mix was such that there was a maximum of 7 concurrent application threads, 6 transaction and 1 query. The mix was designed so that CPU utilization during the base measurement was approximately 90%. The same mix was then used for subsequent runs. The priority of the transactions was higher than the query application. A base measurement was made with all DB2 objects assigned to a single 5000 buffer pool. Each buffer is 4K bytes and can hold 1 page. Several runs of the base measurement were made to verify repeatability. The favorable net results are summarized in Table 1.

As described above, the lab test environment consisted of a workload consisting of a mixture of transactions (with updates) together with a complex read-only queries. The experimental procedure was to run all the query work once, i.e., a "batch" operation, while running the transactions continuously in a "closed loop" until the query work completed. In accordance with common practice, the transactions were given CPU priority. One advantage of this procedure is the assurance that the test did not "overfit", i.e., optimize artifices of the particular trace that was analyzed. In the second run, the transactions behaved quite differently, and in fact achieved a considerably higher throughput.

The key result from the experiments was that after cache assignment, the miss rate for queries dropped by approximately 6%, and the miss rate for transactions dropped by 29%. Note that for the query work, there were a number of table scans which resulted in many compulsory misses. DB2 treats these as known sequential I/O's, and the pages are prefetched accordingly. But it should be remembered that miss rate is directly proportional to physical I/Os, so the miss rate reductions reported are quite significant. For the transaction work, the improved miss rate resulted in a considerably (6%) higher throughput. Since about 90% of the physical I/Os came from the query work, these miss rate reductions are roughly consistent with the results on FIG. 10 (bearing in mind that in FIG. 10, there is an approximately equal amount of compulsory misses).

CONCLUSION

The net results from the experiments show that considerably improved I/O performance, particularly for time-critical transactions, can be obtained by properly splitting and allocating a fixed set of buffering resources, using the method in accordance with the invention.

The intuitive tradeoffs in cache assignment have become quite clear, and in many cases a designer will be content with either a fully split or fully shared cache. But in other cases, as shown, there can be considerable payoff in carrying out an analysis, such as the cache assignment algorithm of the invention, to obtain improved performance with no increase in memory resource expenditure.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer-implemented method for assigning data request streams to various ones of a plurality of data caches, the method comprising the steps of:

obtaining characterization information for the request streams; and determining an assignment of the request streams to the caches using the characterization information, such that a likelihood is optimized that a request from a given request stream is directed to a data page within a cache to which the given request stream is assigned.

2. A method as recited in claim 1, wherein the step of obtaining characterization information includes processing a trace of requests from the request streams.

3. A method as recited in claim 2, wherein the step of processing includes:

processing the requests of the trace successively;

simulating trajectories of data pages requested by the requests in the trace, the trajectories including sequences of cache positions related to the successive processing of the requests of the trace; and calculating depth distributions from the requests for the respective request streams, based on the simulated trajectories.

4. A method as recited in claim 3, wherein the step of processing a trace includes obtaining burst information related to bursts of consecutive requests, within the trace, the consecutive requests within each given burst all coming from the same request stream.

5. A method as recited in claim 4, wherein the step of obtaining burst information includes:

maintaining flags $F_{a,b}$, each flag having a value of TRUE if a page requested from a stream a (designated a type a request) was encountered more recently in the trace than any page requested from a stream b (designated a type b request), and FALSE otherwise;

maintaining variables $n_a$, each variable counting the number of type a requests encountered among the requests of the trace thus far processed;

maintaining variables $B_{a,b}$ each variable counting the number of bursts of consecutive type a requests of the trace, assuming that all requests other than type a or type b requests in the trace are deleted; and for each successive type t request of the trace, updating the flags $F_{a,b}$, the variables $n_a$, and the variables $B_{a,b}$ by (a) incrementing the variable $n_t$, (b) for all types s other than t, testing the state of the flag $F_{s,t}$, and (c) if the state is FALSE, then (i) setting $F_{s,t}$=TRUE, (ii) setting $F_{t,s}$=FALSE, and (iii) incrementing $B_{t,s}$.

6. A method as recited in claim 5, wherein the step of obtaining burst information further includes, following execution of the steps of maintaining flags $F_{a,b}$, maintaining a vector of variables $n_a$, maintaining variables $B_{a,b}$, and updating, the step of:

computing mean burst lengths $M_{a,b}$ according to the formula $$M_{a,b} = \frac{n_a}{B_{a,b}}.$$

7. A method as recited in claim 4, wherein the step of determining an assignment includes:

making an initial fully split assignment of a predetermined number of data pages to a number of caches equal to the number of request streams; and superposing pairs of request streams, thereby making an assignment in which superposed request streams are assigned to a single cache.

8. A method as recited in claim 7 wherein the step of making an initial fully split assignment includes:

(a) calculating an optimal allocation of a subset k of the buffers to a number 1 of caches less than the number of streams;

(b) calculating an optimal allocation, where the number of caches is increased by one, as the allocation having the lowest miss ratio of any allocation in which the k buffers remain allocated to the I caches and all of the remaining buffers are allocated to the one additional cache; and (c) repeating step (b) until the number of caches equals the number of request streams.

9. A method as recited in claim 7, wherein the step of superposing includes:

computing respective superposition reference depth distributions for respective superpositions of the request streams, based on reference depth distributions for the request streams in isolation and on burst rates of the request streams; and comparing the respective superposition reference depth distributions to identify a superposition of request streams which produces an optimum improvement in hit ratio.

10. A method as recited in claim 9, wherein the step of comparing includes comparing the respective superposition reference depth distributions to identify assignments of request streams to the caches which optimize the likelihood that a request from a given request stream is directed to a data page within a cache to which the given request stream is assigned.

11. A processing system for assigning data request streams to various ones of a plurality of data caches, the processing system comprising:

means for obtaining characterization information for the request streams; and means for determining an assignment of the request streams to the caches using the characterization information, such that a likelihood is optimized that a request from a given request stream is directed to a data page within a cache to which the given request stream is assigned.

12. A processing system as recited in claim 11, wherein the means for obtaining characterization information includes means for processing a trace of requests from the request streams.

13. A processing system as recited in claim 12, wherein the means for processing includes:

means for processing the requests of the trace successively;

means for simulating trajectories of data pages requested by the requests in the trace, the trajectories including sequences of cache positions related to the successive processing of the requests of the trace; and means for calculating depth distributions from the requests for the respective request streams, based on the simulated trajectories.

14. A processing system as recited in claim 13, wherein the means for processing a trace includes means for obtaining burst information related to bursts of consecutive requests, within the trace, the consecutive requests within each given burst all coming from the same request stream.

15. A processing system as recited in claim 14, wherein the means for obtaining burst information includes:

means for maintaining flags $F_{a,b}$, each flag having a value of TRUE if a page requested from a stream a (designated a type a request) was encountered more recently in the trace than any page requested from a stream b (designated a type b request), and FALSE otherwise;

means for maintaining of variables $n_a$, each variable counting the number of type a requests encountered among the requests of the trace thus far processed;

means for maintaining variables $B_{a,b}$ each variable counting the number of bursts of consecutive type a requests of the trace, assuming that all requests other than type a or type b requests in the trace are deleted; and means, operable for each successive type t request of the trace, for updating the flags $F_{a,b}$, the variables $n_a$, and the variables $B_{a,b}$ by (a) incrementing the variable $n_t$, (b) for all types s other than t, testing the state of the flag $F_{s,t}$, and (c) if the state is FALSE, then (i) setting $F_{s,t}$=TRUE, (ii) setting $F_{t,s}$=FALSE, and (iii) incrementing $B_{t,s}$.

16. A processing system as recited in claim 15, wherein the means for obtaining burst information further includes:

means; operable following operation of the means for maintaining flags $F_{a,b}$, the means for maintaining a vector of variables $n_a$, the means for maintaining variables $B_{a,b}$, and the means for updating; for computing mean burst lengths $M_{a,b}$ according to the formula $$M_{a,b} = \frac{n_a}{B_{a,b}}.$$

17. A processing system as recited in claim 14, wherein the means for determining an assignment includes:

means for making an initial fully split assignment of a predetermined number of data pages to a number of caches equal to the number of request streams; and means for superposing pairs of request streams, thereby making an assignment in which superposed request streams are assigned to a single cache.

18. A processing system as recited in claim 17 wherein the means for making an initial fully split assignment includes:

(a) means for calculating an optimal allocation of a subset k of the buffers to a number 1 of caches less than the number of streams;

(b) means for calculating an optimal allocation, where the number of caches is increased by one, as the allocation having the lowest miss ratio of any allocation in which the k buffers remain allocated to the 1 caches and all of the remaining buffers are allocated to the one additional cache; and (c) means for repeating operation of the (b) means for calculating an optimal allocation, until the number of caches equals the number of request streams.

19. A processing system method as recited in claim 17, wherein the means for superposing includes:

means for computing respective superposition reference depth distributions for respective superpositions of the request streams, based on reference depth distributions for the request streams in isolation and on burst rates of the request streams; and means for comparing the respective superposition reference depth distributions to identify a superposition of request streams which produces an optimum improvement in hit ratio.

20. A processing system method as recited in claim 19, wherein the means for comparing includes means for comparing the respective superposition depth distributions to identify assignments of request streams to the caches which optimize the likelihood that a request from a given request stream is directed to a data page within a cache to which the given request stream is assigned.

21. A computer program product, for use with a processing system, for directing the processing system to assign data request streams to various ones of a plurality of data caches, the computer program product comprising:

a recording medium;

means, recorded on the recording medium, for directing the processing system to obtain characterization information for the request streams; and means, recorded on the recording medium, for directing the processing system to determine an assignment of the request streams to the caches using the characterization information, such that a likelihood is optimized that a request from a given request stream is directed to a data page within a cache to which the given request stream is assigned.

22. A computer program product as recited in claim 21, wherein the means for directing to obtain characterization information includes means, recorded on the recording medium, for directing the processing system to process a trace of requests from the request streams.

23. A computer program product as recited in claim 22, wherein the means for directing to process includes:

means, recorded on the recording medium, for directing the processing system to process the requests of the trace successively;

means, recorded on the recording medium, for directing the processing system to simulate trajectories of data pages requested by the requests in the trace, the trajectories including sequences of cache positions related to the successive processing of the requests of the trace; and means, recorded on the recording medium, for directing the processing system to calculate depth distributions from the requests for the respective request streams, based on the simulated trajectories.

24. A computer program product as recited in claim 23, wherein the means for directing to process a trace includes means, recorded on the recording medium, for directing the processing system to obtain burst information related to bursts of consecutive requests, within the trace, the consecutive requests within each given burst all coming from the same request stream.

25. A computer program product as recited in claim 24, wherein the means for directing to obtain burst information includes:

means, recorded on the recording medium, for directing the processing system to maintain flags $F_{a,b}$, each flag having a value of TRUE if a page requested from a stream a (designated a type a request) was encountered more recently in the trace than any page requested from a stream b (designated a type b request), and FALSE otherwise;

means, recorded on the recording medium, for directing the processing system to maintain variables $n_a$, each variable counting the number of type a requests encountered among the requests of the trace thus far processed;

means, recorded on the recording medium, for directing the processing system to maintain variables $B_{a,b}$, each variable counting the number of bursts of consecutive type a requests of the trace, assuming that all requests other than type a or type b requests in the trace are deleted; and means, recorded on the recording medium, for directing the processing system, for each successive type t request of the trace, to update the flags $F_{a,b}$, the variables $n_a$, and the variables $B_{a,b}$ by (a) incrementing the variable $n_t$, (b) for all types s other than t, testing the state of the flag $F_{s,t}$, and (c) if the state is FALSE, then (i) setting $F_{s,t}$=TRUE, (ii) setting $F_{t,s}$=FALSE, and (iii) incrementing $B_{t,s}$.

26. A computer program product as recited in claim 25, wherein the means for directing to obtain burst information further includes means; operable following operation of the means for directing to maintain flags $F_{a,b}$, the means for directing to maintain a vector of variables $n_a$, the means for directing to maintain variables $B_{a,b}$, and the means for directing to update; for directing the processing system to compute mean burst lengths $M_{a,b}$ according to the formula $$M_{a,b} = \frac{n_a}{B_{a,b}}.$$

27. A computer program product as recited in claim 24, wherein the means for directing to determine an assignment includes:

means, recorded on the recording medium, for directing the processing system to make an initial fully split assignment of a predetermined number of data pages to a number of caches equal to the number of request streams; and means, recorded on the recording medium for directing the processing system to superpose pairs of request streams, thereby making an assignment in which superposed request streams are assigned to a single cache.

28. A computer program product as recited in claim 27 wherein the means for directing to make an initial fully split assignment includes:

(a) means, recorded on the recording medium, for directing the processing system to calculate an optimal allocation of a subset k of the buffers to a number 1 of caches less than the number of streams;

(b) means, recorded on the recording medium, for directing the processing system to calculate an optimal allocation, where the number of caches is increased by one, as the allocation having the lowest miss ratio of any allocation in which the k buffers remain allocated to the 1 caches and all of the remaining buffers are allocated to the one additional cache; and (c) means, recorded on the recording medium, for directing the processing system to operate the (b) means for directing to calculate, repetitively, until the number of caches equals the number of request streams.

29. A computer program product as recited in claim 27, wherein the means for directing to superpose includes:

means, recorded on the recording medium, for directing the processing system to compute respective superposition reference depth distributions for respective superpositions of the request streams, based on reference depth distributions for the request streams in isolation and on burst rates of the request streams; and means, recorded on the recording medium, for directing the processing system to compare the respective superposition reference depth distributions to identify a superposition of request streams which produces an optimum improvement in hit ratio.

30. A computer program product as recited in claim 29, wherein the means for directing to compare includes means, recorded on the recording medium, for directing the processing system to compare the respective superposition reference depth distributions to identify assignments of request streams to the caches which optimize the likelihood that a request from a given request stream is directed to a data page within a cache to which the given request stream is assigned.

* * * * *